United States Patent
Takahashi et al.

(10) Patent No.: US 11,292,205 B2
(45) Date of Patent: Apr. 5, 2022

(54) METHOD OF ATTACHING REGULATING BLADE

(71) Applicant: CANON KABUSHIKI KAISHA, Tokyo (JP)

(72) Inventors: Masafumi Takahashi, Tsukubamirai (JP); Tomohiro Shiomi, Abiko (JP); Shunichi Koga, Abiko (JP); Teruaki Tsurusaki, Moriya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/442,118

(22) Filed: Jun. 14, 2019

(65) Prior Publication Data

US 2019/0381743 A1   Dec. 19, 2019

(30) Foreign Application Priority Data

Jun. 19, 2018 (JP) .............................. JP2018-116527

(51) Int. Cl.
*B29C 65/48* (2006.01)
*G03G 15/08* (2006.01)
*B29L 31/00* (2006.01)

(52) U.S. Cl.
CPC ......... *B29C 65/48* (2013.01); *G03G 15/0812* (2013.01); *B29L 2031/767* (2013.01)

(58) Field of Classification Search
None
See application file for complete search history.

(56) References Cited

U.S. PATENT DOCUMENTS

| 6,423,941 B1* | 7/2002 | Kanari | G03G 15/2064 |
| | | | 219/216 |
| 2014/0321887 A1 | 10/2014 | Matsumoto | |
| 2017/0219962 A1* | 8/2017 | Sasaki | G03G 15/0817 |
| 2019/0072876 A1* | 3/2019 | Shiomi | G03G 15/0812 |

FOREIGN PATENT DOCUMENTS

| JP | 2002-072671 A | 3/2002 |
| JP | 2003-195641 A | 7/2003 |
| JP | 2014-197175 A | 10/2014 |
| JP | 2015-57624 A | 3/2015 |
| JP | 2017-049527 A | 3/2017 |

* cited by examiner

*Primary Examiner* — Mark A Osele
*Assistant Examiner* — Evan T Hulting
(74) *Attorney, Agent, or Firm* — Canon U.S.A., Inc. IP Division

(57) ABSTRACT

A force for adjusting a relative position of a regulating blade relative to a development rotary member supported by a development frame member is applied to the regulating blade so that a gap between the development rotary member and the regulating blade when attached to an attachment portion falls within a predetermined range in a rotational axis direction of the development rotary member in a state that the regulating blade is separated from the attachment portion with an adhesive applied. The regulating blade is attached, with the adhesive, to the attachment portion with the adhesive applied so that the gap between the development rotary member and the regulating blade with the force applied falls within the predetermined range.

8 Claims, 14 Drawing Sheets

METHOD OF ATTACHING REGULATING BLADE

CROSS-REFERENCE TO RELATED APPLICATIONS

This application claims the benefit of Japanese Patent Application No. 2018-116527, filed Jun. 19, 2018, which is hereby incorporated by reference herein in its entirety.

BACKGROUND OF THE INVENTION

Field of the Invention

The present invention relates to a method of attaching a regulating blade made of resin.

Description of the Related Art

A developing device includes a development frame member, a developer bearing member that is rotatable and that carries a developer to develop an electrostatic latent image formed on an image bearing member, and a regulating blade serving as a developer regulating member that regulates the amount (coating amount) of the developer carried by the developer bearing member. The regulating blade is disposed to face the developer bearing member in the lengthwise direction of the developer bearing member with a predetermined gap (hereinafter, referred to as SB gap) provided between the regulating blade and the developer bearing member. The SB gap is the shortest distance between the developer bearing member and the regulating blade. By adjusting the size of the SB gap, the amount of the developer to be conveyed toward the position at which the electrostatic latent image formed on the image bearing member is developed (a development area where the developer bearing member faces the image bearing member) is adjusted.

In recent years, there has been known a developing device including a developer regulating member made of resin and molded using resin, and a development frame member made of resin and molded using resin (see Japanese Patent Laid-Open No. 2014-197175).

As the width of a sheet on which an image is formed increases, the area of the surface of the regulating blade (coating-amount regulating surface) that regulates the amount of the developer carried by the developer bearing member corresponding to an image area that can be formed on the image bearing member increases. This leads to an increase in the length of the regulating blade in the lengthwise direction. When the regulating blade having the increased length in the lengthwise direction is molded using resin, the thermal contraction ratio of thermally expanded resin likely varies. Owing to this, when the regulating blade having the increased length in the lengthwise direction is molded using resin, it is difficult to ensure the straightness of the coating-amount regulating surface of the regulating blade made of resin and molded using resin.

Thus, in the regulating blade made of resin, the SB gap more likely varies in the lengthwise direction of the developer bearing member due to the straightness of the coating-amount regulating surface as the length of the regulating blade in the lengthwise direction increases. If the SB gap varies in the lengthwise direction of the developer bearing member, the amount of the developer carried by the developer bearing member may be uneven in the lengthwise direction of the developer bearing member. Thus, in the developing device including the regulating blade made of resin, it is requested to set the SB gap within a predetermined range in the lengthwise direction of the developer bearing member, and to apply a force for warping the regulating blade to the regulating blade, irrespective of the straightness of the coating-amount regulating surface.

In addition, the developer bearing member has a component tolerance of the developer bearing member and an assembly tolerance of the developer bearing member when the developer bearing member is assembled with the development frame member. Thus, by taking into account the component tolerance of the developer bearing member and the assembly tolerance of the developer bearing member, when the regulating blade made of resin is fixed to a blade attachment portion of the development frame member made of resin, it is required to adjust the relative position of the regulating blade relative to the developer bearing member assembled with the development frame member.

Owing to this, the following configuration may be conceived as a configuration that fixes the regulating blade made of resin to the blade attachment portion of the development frame member made of resin using an adhesive. The configuration applies a force for warping the regulating blade while the relative position of the regulating blade relative to the developer bearing member assembled with the development frame member is adjusted in a state that the regulating blade is attached to the blade attachment portion on which the adhesive has been applied. With this configuration, the application of the force for warping the regulating blade causes a force of action and reaction to be applied to a surface of the blade attachment portion that contacts the regulating blade. Consequently, the surface of the blade attachment portion that contacts the regulating blade is elastically deformed. The regulating blade is fixed to the blade attachment portion using the adhesive in the state that the surface of the blade attachment portion that contacts the regulating blade is elastically deformed.

In the configuration in which the regulating blade is fixed to the blade attachment portion using the adhesive in the state that the surface of the blade attachment portion that contacts the regulating blade is elastically deformed, the application of the force for warping the regulating blade is stopped. Then, as the result of stopping the force, the surface of the blade attachment portion that contacts the regulating blade is deformed so as to be restored to the original state before the elastic deformation. Consequently, the position of a distal end portion of the regulating blade bonded to the blade attachment portion varies, and the relative position of the regulating blade relative to the developer bearing member supported by the development frame member varies.

Although the regulating blade is fixed to the blade attachment portion using the adhesive so that the size of the SB gap falls within the predetermined range, due to the variations, the size of the SB gap may vary after the regulating blade is bonded to the blade attachment portion. Since the regulating blade has been already bonded to the blade attachment portion, it is difficult to adjust again the relative position of the regulating blade relative to the developer bearing member supported by the development frame member so that the size of the SB gap falls within the predetermined range.

Owing to this, the following configuration may be requested for the configuration that fixes the regulating blade made of resin to the blade attachment portion of the development frame member made of resin using the adhesive. The configuration applies a force for warping the regulating blade while the relative position of the regulating blade relative to the developer bearing member assembled with the development frame member is adjusted so that the surface of the blade attachment portion that contacts the regulating blade is not elastically deformed.

The present invention is made in light of the above-described situations. The present invention provides a method of attaching a regulating blade so that, in a configuration that attaches, with an adhesive, the regulating blade made of resin and having low precision of straightness of a regulating portion to an attachment portion of a development frame member made of resin, an SB gap falls within a predetermined range in the lengthwise direction of a developer bearing member.

SUMMARY OF THE INVENTION

The present invention provides a method of attaching a regulating blade that can cause a gap between a development rotary member and the regulating blade to fall within a predetermined range in a rotational axis direction of the development rotary member even when the regulating blade made of resin is attached, with an adhesive, to the development frame member made of resin.

The present invention according to an aspect provides a method of attaching a regulating blade made of resin, disposed to face a development rotary member in a non-contact manner, and configured to regulate an amount of a developer carried by the development rotary member, the development rotary member carrying and conveying the developer toward a position at which an electrostatic latent image formed on an image bearing member is developed, the method attaching the regulating blade to an attachment portion of a development frame member made of resin and having the attachment portion to which the regulating blade is to be attached, the method of attaching the regulating blade includes an adhesive application step of applying an adhesive to the attachment portion; a force application step of applying a force for adjusting a relative position of the regulating blade relative to the development rotary member supported by the development frame member to the regulating blade so that a gap between the development rotary member supported by the development frame member and the regulating blade when the regulating blade is attached to the attachment portion falls within a predetermined range in a rotational axis direction of the development rotary member in a state that the regulating blade is separated from the attachment portion on which the adhesive has been applied in the adhesive application step; and an attachment step of attaching, with the adhesive, the regulating blade to the attachment portion on which the adhesive has been applied in the adhesive application step so that the gap between the development rotary member supported by the development frame member and the regulating blade to which the force has been applied in the force application step falls within the predetermined range in the rotational axis direction of the development rotary member.

Further features of the present invention will become apparent from the following description of exemplary embodiments with reference to the attached drawings.

DESCRIPTION OF THE EMBODIMENTS

Embodiments of the present invention are described below in detail with reference to the attached drawings. The following embodiments do not intend to limit the present invention described in the claims, and not all the combinations of the features described in a first embodiment are essential to solving measures of the present invention. The present invention can be embodied for various purposes of use, such as a printer, any one of various printing machines, a copying machine, a facsimile, and a multi-function machine.

First Embodiment

Configuration of Image Forming Apparatus

Figure 1:
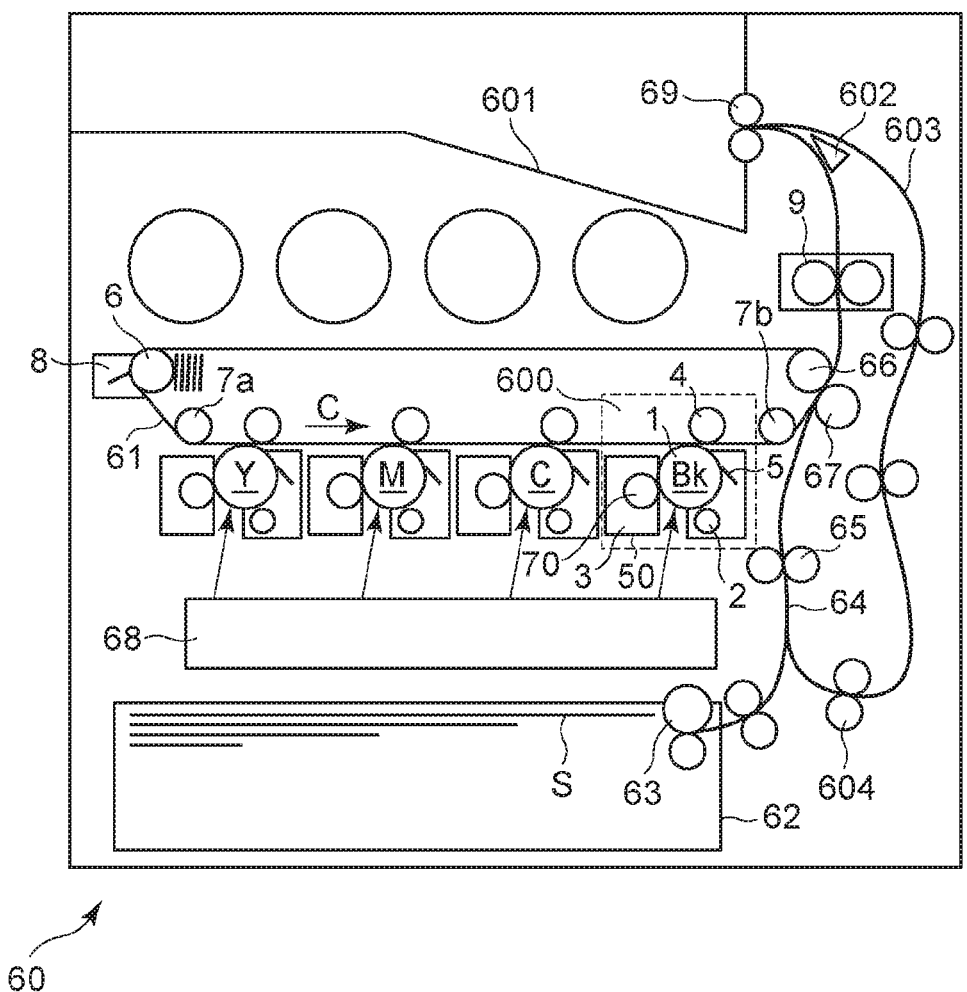
FIG. 1 is a cross-sectional view illustrating a configuration of an image forming apparatus.

First, a configuration of an image forming apparatus according to a first embodiment of the present invention is described with reference to a cross-sectional view of FIG. 1. As illustrated in FIG. 1, an image forming apparatus 60 includes an endless intermediate transfer belt (ITB) 61 serving as an intermediate transfer member, and four image forming units 600 disposed from the upstream side to the downstream side along the rotation direction (arrow C direction in FIG. 1) of the intermediate transfer belt 61. The image forming units 600 individually form toner images of respective colors of yellow (Y), magenta (M), cyan (C), and black (Bk).

Each of the image forming units 600 includes a rotatable photoreceptor drum 1 serving as an image bearing member. The image forming unit 600 also includes a charging roller 2 serving as a charging portion, a developing device 3 serving as a developing portion, a primary transfer roller 4 serving as a primary transfer portion, and a photoreceptor cleaner 5 serving as a photoreceptor cleaning portion, which are disposed along the rotation direction of the photoreceptor drum 1.

Each developing device 3 is removably attachable to the image forming apparatus 60. Each developing device 3 has a development container 50 that accommodates a two-component developer (hereinafter, merely referred to as developer) containing a nonmagnetic toner (hereinafter, merely referred to as toner) and a magnetic carrier. Moreover, toner cartridges that accommodate toners of the respective colors of Y, M, C, and Bk are removably attachable to the image forming apparatus 60. The toners of the respective colors of Y, M, C, and Bk are supplied to the corresponding development containers 50 via toner conveyance paths. Each developing device 3 will be described later in detail with reference to FIGS. 2 to 4, and each development container 50 will be described later in detail with reference to FIG. 5.

The intermediate transfer belt 61 is supported with a tension by a tension roller 6, a driven roller 7a, the primary transfer rollers 4, a driven roller 7b, and a secondary transfer inner roller 66, and is driven to be conveyed in the arrow C direction in FIG. 1. The secondary transfer inner roller 66 also serves as a driving roller that drives the intermediate transfer belt 61. The secondary transfer inner roller 66 rotates, following which the intermediate transfer belt 61 rotates in the arrow C direction in FIG. 1.

The intermediate transfer belt 61 is pressed by the primary transfer rollers 4 from the back-surface side of the intermediate transfer belt 61. In addition, the intermediate transfer belt 61 is brought into contact with the photoreceptor drums 1, and hence primary transfer nip parts serving as primary transfer portions are formed between the photoreceptor drums 1 and the intermediate transfer belt 61.

An intermediate-transfer-member cleaner 8 serving as a belt cleaning portion contacts the intermediate transfer belt 61 at a position at which the intermediate-transfer-member cleaner 8 faces the tension roller 6 via the intermediate transfer belt 61. In addition, a secondary transfer outer roller 67 serving as a secondary transfer portion is disposed at a position at which the secondary transfer outer roller 67 faces the secondary transfer inner roller 66 via the intermediate transfer belt 61. The intermediate transfer belt 61 is pinched between the secondary transfer inner roller 66 and the secondary transfer outer roller 67. Thus, a secondary transfer nip part serving as a secondary transfer portion is formed between the secondary transfer outer roller 67 and the intermediate transfer belt 61. At the secondary transfer nip part, a toner image is attracted to a surface of a sheet S (for example, paper or film) by applying a predetermined pressing force and a transfer bias (electrostatic load bias).

Sheets S are stored in a sheet storage portion 62 (for example, feed cassette or feed deck) in a stacked manner. A feed portion 63 feeds a sheet S in synchronization with an image formation timing by using, for example, a frictional separation system using a feed roller. The sheet S sent out by the feed portion 63 is conveyed to a registration roller 65 disposed in the middle of a conveyance path 64. The registration roller 65 corrects skew and timing of the sheet S, and then conveys the sheet S to the secondary transfer nip part. The timing of the sheet S meets the timing of the toner image at the secondary transfer nip part, and hence secondary transfer is performed.

A fixing device 9 is disposed downstream of the secondary transfer nip part in a conveyance direction of the sheet S. The fixing device 9 applies a predetermined pressure and a predetermine quantity of heat to the sheet S conveyed to the fixing device 9, thereby melting and fixing the toner image on the surface of the sheet S. The sheet S on which the image has been thus fixed is directly discharged to a discharge tray 601 through forward rotation of a discharge roller 69.

To perform double-sided image formation, the sheet S is conveyed until the trailing end of the sheet S passes through a switching member 602 through forward rotation of the discharge roller 69, and then the discharge roller 69 is rotated backward. The backward rotation of the discharge roller 69 flips the sheet S from the leading end to the trailing end and conveys the sheet S to a double-sided conveyance path 603. Then, a re-feed roller 604 conveys the sheet S to the conveyance path 64 again in synchronization with the next image formation timing.

Image Formation Process

The photoreceptor drum 1 is rotationally driven by a motor during image formation. The charging roller 2 uniformly electrostatically charges in advance a surface of the photoreceptor drum 1 that is being rotationally driven. An exposure device 68 forms an electrostatic latent image on the surface of the photoreceptor drum 1 that has been electrostatically charged by the charging roller 2 on the basis of a signal of image information input to the image forming apparatus 60. The photoreceptor drum 1 can form any one of a plurality of sizes of electrostatic latent images.

The developing device 3 has a rotatable developing sleeve 70 serving as a developer bearing member that carries a developer. The developing device 3 develops the electrostatic latent image formed on the surface of the photoreceptor drum 1, by using the developer carried on a surface of the developing sleeve 70. Thus, a toner adheres to an exposure portion exposed to light on the surface of the photoreceptor drum 1 and the electrostatic latent image is turned into a visible image. A transfer bias (electrostatic load bias) is applied to the primary transfer roller 4, and the toner image formed on the surface of the photoreceptor drum 1 is transferred onto the intermediate transfer belt 61. The toner slightly remaining on the surface of the photoreceptor drum 1 after the primary transfer (transfer residual toner) is collected by the photoreceptor cleaner 5 for preparation for the next image formation process.

Image formation processes of the respective colors, the processes which are executed in parallel by the image forming units 600 of the respective colors of Y, M, C, and Bk, are performed at timings so that a toner image of a color is successively superposed on a toner image of an upstream color primarily transferred on the intermediate transfer belt 61. Consequently, a full-color toner image is formed on the intermediate transfer belt 61 and the toner image is conveyed to the secondary transfer nip part. A transfer bias is applied to the secondary transfer outer roller 67, and the toner image formed on the intermediate transfer belt 61 is transferred onto the sheet S conveyed to the secondary transfer nip part. The toner slightly remaining on the intermediate transfer belt 61 after the sheet S passes through the secondary transfer nip part (transfer residual toner) is collected by the intermediate-transfer-member cleaner 8. The fixing device 9 fixes the toner image transferred on the sheet S. The sheet S (recording medium) on which the fixing device 9 has performed the fixing process is discharged to the discharge tray 601.

A series of the image formation processes such as one described above is completed and preparation is made for the next image forming operation.

Configuration of Developing Device

Figure 2:
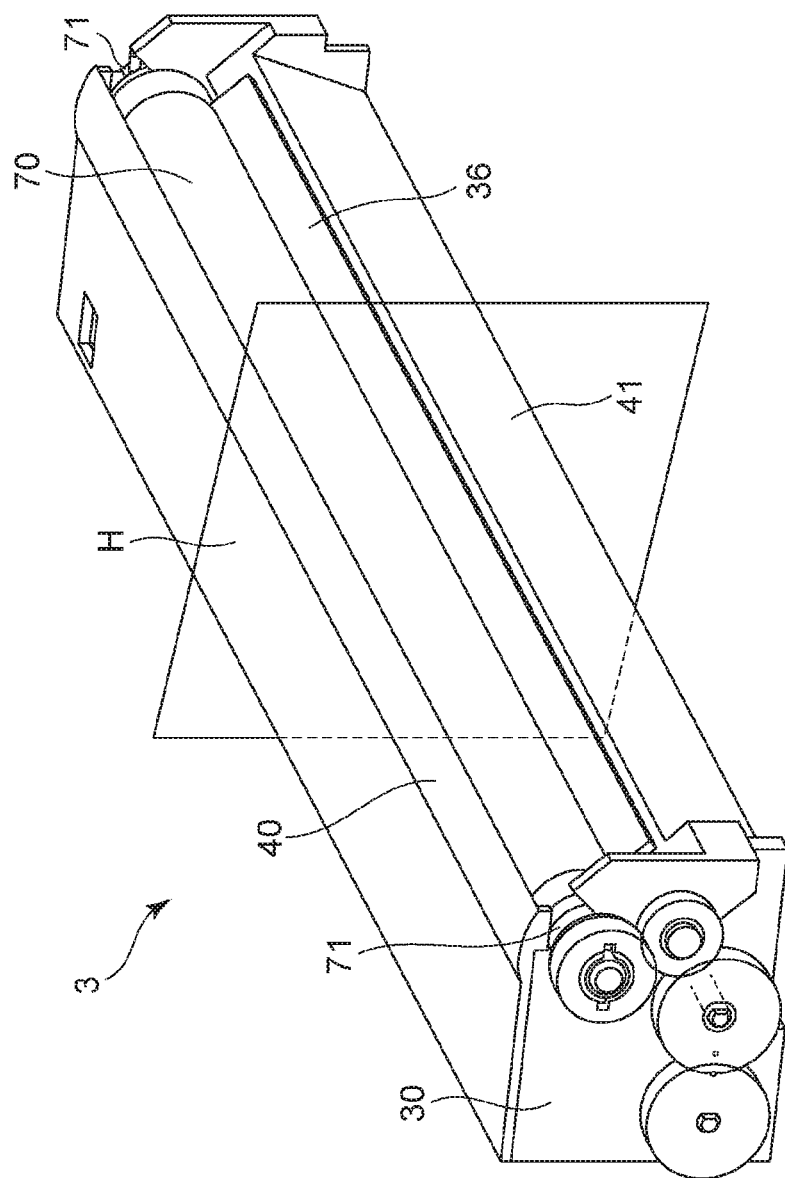
FIG. 2 is a perspective view illustrating a configuration of a developing device according to a first embodiment.
Figure 3:
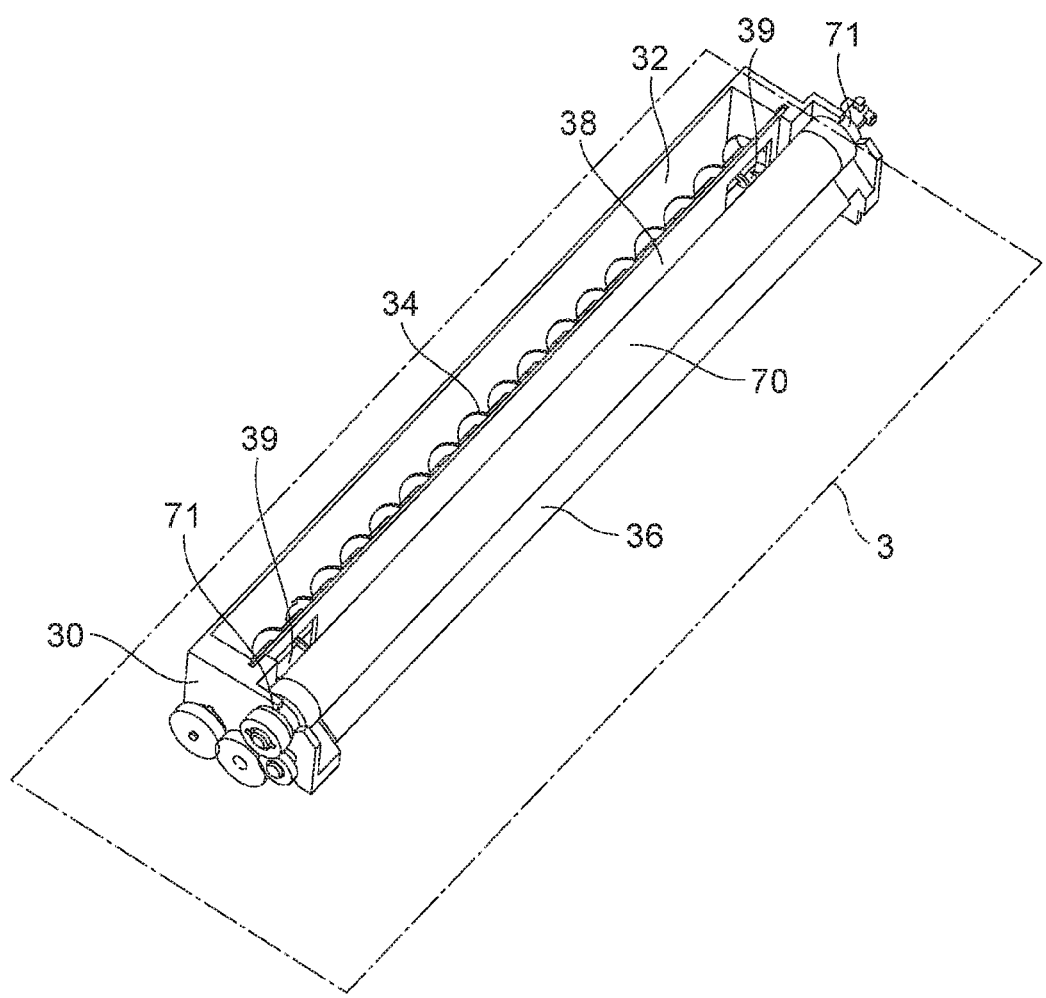
FIG. 3 is a perspective view illustrating the configuration of the developing device according to the first embodiment.
Figure 4:
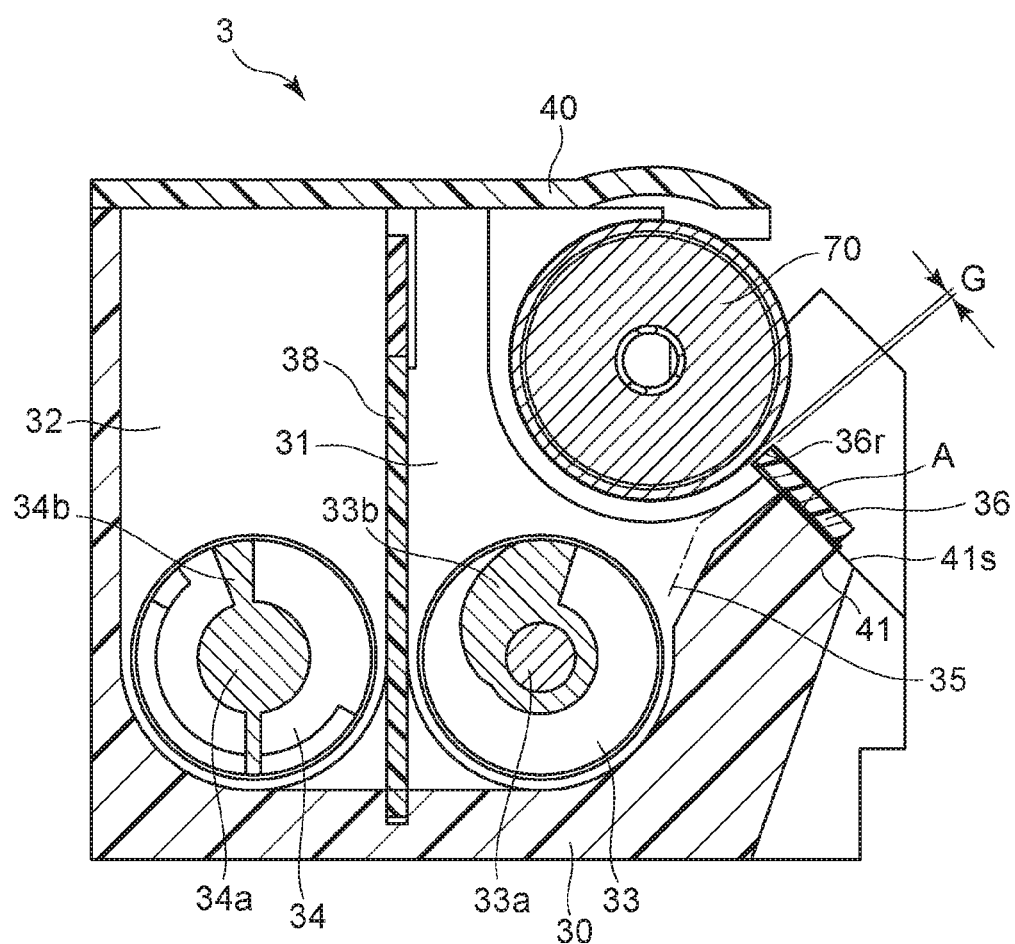
FIG. 4 is a cross-sectional view illustrating the configuration of the developing device according to the first embodiment.

A configuration of the developing device according to the first embodiment of the present invention is described next with reference to a perspective view in FIG. 2, a perspective view in FIG. 3, and a cross-sectional view in FIG. 4. FIG. 4 is a cross-sectional view of the developing device 3 along a section H in FIG. 2.

The developing device 3 includes the development container 50. The development container 50 includes a development frame member made of resin and molded using resin (hereinafter, merely referred to as development frame member 30), and a cover frame member made of resin and molded using resin (hereinafter, merely referred to as cover frame member 40), the cover frame member 40 formed separately from the development frame member 30. FIGS. 2 and 4 illustrate a state that the cover frame member 40 is attached to the development frame member 30. FIG. 3 illustrates a state that the cover frame member 40 is not attached to the development frame member 30. The configuration of the development frame member 30 (single member) will be described later in detail with reference to FIG. 6.

The development container 50 has an opening at a position corresponding to the development area where the developing sleeve 70 faces the photoreceptor drum 1. The developing sleeve 70 is disposed to be rotatable relative to the development container 50 so that a portion of the developing sleeve 70 is exposed at the opening of the development container 50. Bearings 71 serving as bearing members are provided at both end portions of the developing sleeve 70.

The inside of the development container 50 is divided (parted) into a developing chamber 31 serving as a first chamber and a stirring chamber 32 serving as a second chamber by a partition wall 38 extending in the vertical direction. The developing chamber 31 and the stirring chamber 32 are connected to each other at both ends in the lengthwise direction via communication portions 39 provided at two positions of the partition wall 38. Hence, the developer can move between the developing chamber 31 and the stirring chamber 32 via the communication portions 39. The developing chamber 31 and the stirring chamber 32 are disposed side by side in the horizontal direction.

In the developing sleeve 70, a magnetic roller serving as a magnetic-field generating portion is fixedly disposed. The magnetic-field generating portion has a plurality of magnetic poles along the rotation direction of the developing sleeve 70 and generates magnetic fields for causing the surface of the developing sleeve 70 to carry the developer. The developer in the developing chamber 31 is brought up by the effect of the magnetic fields provided by the magnetic poles of the magnetic roller, and is supplied to the developing sleeve 70. Since the developer is supplied from the developing chamber 31 to the developing sleeve 70 in this way, the developing chamber 31 is also referred to as supply chamber.

In the developing chamber 31, a first conveying screw 33 serving as a conveying portion that stirs the developer in the developing chamber 31 and conveys the developer is disposed to face the developing sleeve 70. The first conveying screw 33 includes a rotary shaft 33a serving as a rotatable shaft portion, and a helical blade portion 33b serving as a developer conveying portion provided along the outer periphery of the rotary shaft 33a. The first conveying screw 33 is supported to be rotatable relative to the development container 50. Bearing members are provided at both end portions of the rotary shaft 33a.

In the stirring chamber 32, a second conveying screw 34 serving as a conveying portion that stirs the developer in the stirring chamber 32 and conveys the developer in a direction opposite to the conveyance direction of the first conveying screw 33 is disposed. The second conveying screw 34 includes a rotary shaft 34a serving as a rotatable shaft portion, and a helical blade portion 34b serving as a developer conveying portion provided along the outer periphery of the rotary shaft 34a. The second conveying screw 34 is supported to be rotatable relative to the development container 50. Bearing members are provided at both end portions of the rotary shaft 34a. When the first conveying screw 33 and the second conveying screw 34 are rotationally driven, a circulation path through which the developer circulates is formed between the developing chamber 31 and the stirring chamber 32 via the communication portions 39.

In the development container 50, a regulating blade (hereinafter, referred to as doctor blade 36) serving as a developer regulating member that regulates the amount (also referred to as developer coating amount) of the developer carried on the surface of the developing sleeve 70 is attached to face the surface of the developing sleeve 70 in a non-contact manner. The doctor blade 36 has a coating-amount regulating surface 36r serving as a regulating portion that regulates the amount of the developer carried on the surface of the developing sleeve 70. The doctor blade 36 is a doctor blade made of resin and molded using resin. The configuration of the doctor blade 36 (single member) will be described later in detail with reference to FIG. 5.

The doctor blade 36 is disposed to face the developing sleeve 70 in the lengthwise direction of the developing sleeve 70 (a direction parallel to the rotational axis of the developing sleeve 70) with a predetermined gap (hereinafter, referred to as SB gap G) provided between the doctor blade 36 and the developing sleeve 70. According to an embodiment of the present invention, it is assumed that the SB gap G is the shortest distance between the maximum image area of the developing sleeve 70 and the maximum image area of the doctor blade 36. The maximum image area of the developing sleeve 70 is an area of the developing sleeve 70 corresponding to the maximum image area among image areas in which images each can be formed on the surface of the photoreceptor drum 1 in the rotational axis direction of the developing sleeve 70 (a maximum image area of the developing sleeve 70). The maximum image area of the doctor blade 36 is an area of the doctor blade 36 corresponding to the maximum image area among image areas in which images each can be formed on the surface of the photoreceptor drum 1 in a direction parallel to the rotational axis of the developing sleeve 70. According to the first embodiment, because the photoreceptor drum 1 can form any one of a plurality of sizes of electrostatic latent images, the maximum image area represents an image area corresponding to the largest size (for example, A3 size) among the image areas of the plurality of sizes with which images each can be formed on the photoreceptor drum 1. In contrast, according to a modification in which the photoreceptor drum 1 can form an electrostatic latent image of only one size, the maximum image area represents an image area of the one size with which an image can be formed on the photoreceptor drum 1.

The doctor blade 36 is disposed to substantially face a peak position of magnetic flux densities of the magnetic poles of the magnetic roller. The developer supplied to the developing sleeve 70 is affected by the magnetic fields of the magnetic poles of the magnetic roller. In addition, the developer regulated and scraped by the doctor blade 36 tends to stay in an upstream portion of the SB gap G. Consequently, a developer pool is formed upstream of the doctor blade 36 in the rotation direction of the developing sleeve 70. The developer in the developer pool is partly conveyed to pass through the SB gap G along with the rotation of the developing sleeve 70. At this time, the coating-amount regulating surface 36r of the doctor blade 36 regulates the layer thickness of the developer passing through the SB gap G. In this way, a thin layer of the developer is formed on the surface of the developing sleeve 70.

A predetermined amount of the developer carried on the surface of the developing sleeve 70 is conveyed to the development area along with the rotation of the developing sleeve 70. By adjusting the size of the SB gap G, the amount of the developer to be conveyed to the development area is adjusted. According to the first embodiment, the size of the SB gap G as a target when the size of the SB gap G is adjusted (a target value of the SB gap G) is set to about 300 μm.

The developer conveyed to the development area magnetically rises in the development area and forms a magnetic brush. The magnetic brush contacts the photoreceptor drum 1 and hence the toner in the developer is supplied to the photoreceptor drum 1. Then, an electrostatic latent image formed on the surface of the photoreceptor drum 1 is developed as a toner image. The developer on the surface of the developing sleeve 70 after the developer passes through the development area and supplies the toner to the photoreceptor drum 1 (hereinafter, referred to as developer after development step) is peeled off from the surface of the developing sleeve 70 due to a repulsive magnetic field formed between the magnetic poles of the same pole of the magnetic roller. The developer after the development step peeled off from the surface of the developing sleeve 70 falls to the developing chamber 31 and hence is collected by the developing chamber 31.

As illustrated in FIG. 4, the development frame member 30 is provided with the developer guide portion 35 for guiding the developer to be conveyed toward the SB gap G. The developer guide portion 35 and the development frame member 30 are integrally formed. The developer guide portion 35 and the doctor blade 36 are separately formed. The developer guide portion 35 is formed inside the development frame member 30, and is disposed upstream of the coating-amount regulating surface 36*r* of the doctor blade 36 in the rotation direction of the developing sleeve 70. The developer guide portion 35 stabilizes the flow of the developer and trims the developer to have a predetermined developer density. Thus, the weight of the developer at a position at which the coating-amount regulating surface 36*r* of the doctor blade 36 is the closest to the surface of the developing sleeve 70 can be determined.

In addition, as illustrated in FIG. 4, the cover frame member 40 is formed separately from the development frame member 30, and is attached to the development frame member 30. The cover frame member 40 covers a portion of the opening of the development frame member 30 to cover a portion of the outer peripheral surface of the developing sleeve 70 in the entire range in the lengthwise direction of the developing sleeve 70. In this case, the cover frame member 40 covers a portion of the opening of the development frame member 30 so that the development area of the developing sleeve 70 facing the photoreceptor drum 1 is exposed. The cover frame member 40 is fixed to the development frame member 30 by ultrasonic bonding; however, the method of fixing the cover frame member 40 to the development frame member 30 may employ any method such as one of screw fastening, snap fitting, bonding, and welding. Referring to FIG. 4, the cover frame member 40 may be formed of one part (resin molded part) or may be formed of a plurality of parts (resin molded parts).

Configuration of Doctor Blade Made of Resin

The configuration of the doctor blade 36 (single member) is described with reference to a perspective view in FIG. 5.

During the image forming operation (development operation), a pressure of the developer generated from a flow of the developer (hereinafter, referred to as developer pressure) is exerted on the doctor blade 36. As the rigidity of the doctor blade 36 is lower, the doctor blade 36 is more likely deformed and the size of the SB gap G more likely varies when the developer pressure is exerted on the doctor blade 36 during the image forming operation. The developer pressure is exerted on the doctor blade 36 in the widthwise direction (in an arrow M direction in FIG. 5) of the doctor blade 36 during the image forming operation. To suppress variations in the size of the SB gap G during the image forming operation, it is desirable to increase the rigidity of the doctor blade 36 in the widthwise direction and hence to be resistant to deformation of the doctor blade 36 in the widthwise direction.

Figure 5:
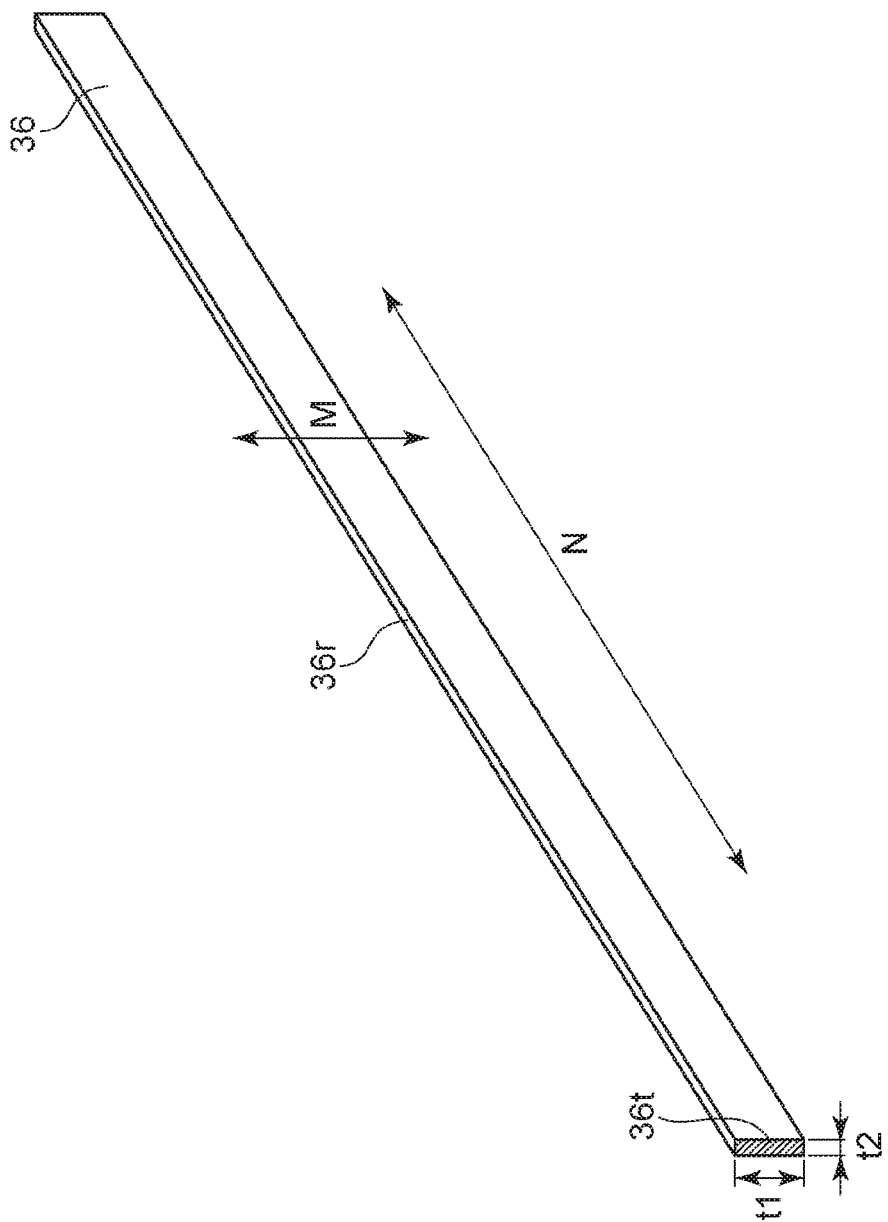
FIG. 5 is a perspective view illustrating a configuration of a doctor blade (single member) made of resin.

As illustrated in FIG. 5, the shape of the doctor blade 36 is a plate shape in viewpoints of mass production and cost. In addition, as illustrated in FIG. 5, the sectional area of a side surface 36*t* of the doctor blade 36 is decreased, and a length t2 of the doctor blade 36 in the thickness direction is smaller than a length t1 of the doctor blade 36 in the widthwise direction. Accordingly, the doctor blade 36 (single member) is likely deformed in a direction (arrow M direction in FIG. 5) orthogonal to the lengthwise direction (arrow N direction in FIG. 5) of the doctor blade 36. To correct the straightness of the coating-amount regulating surface 36*r*, the doctor blade 36 is fixed to a blade attachment portion 41 of the development frame member 30 in a state that at least a portion of the doctor blade 36 is warped in the arrow M direction in FIG. 5. The correction on the straightness of the doctor blade 36 will be described later in detail with reference to FIG. 11 and other subsequent drawings (particularly, FIG. 12).

Configuration of Development Frame Member Made of Resin

Figure 6:
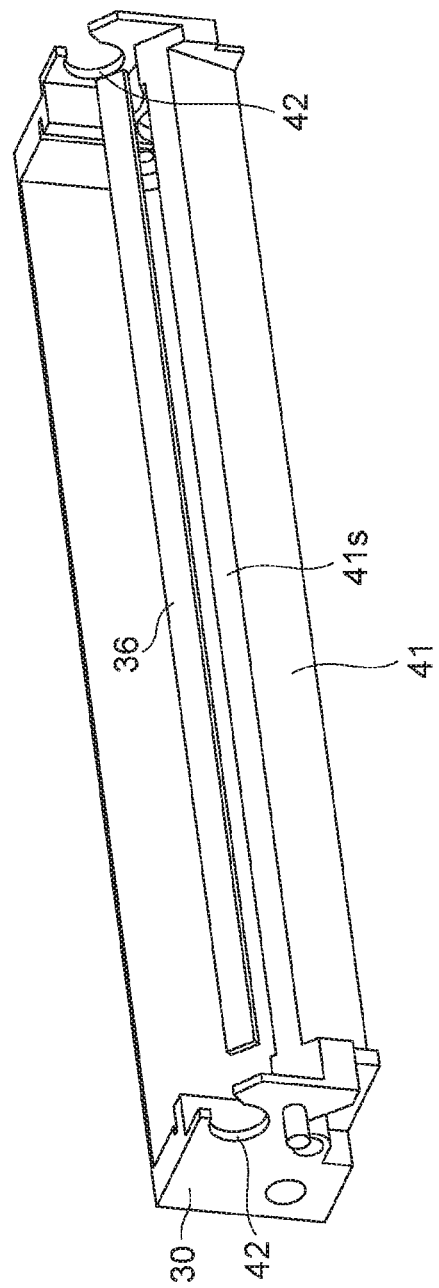
FIG. 6 is a perspective view illustrating a configuration of a development frame member (single member) made of resin.

The configuration of the development frame member 30 (single member) is described with reference to a perspective view in FIG. 6. FIG. 6 illustrates the state that the cover frame member 40 is not attached to the development frame member 30.

The development frame member 30 includes the developing chamber 31 and the stirring chamber 32 separated from the developing chamber 31 by the partition wall 38. The partition wall 38 is molded using resin. The partition wall 38 may be formed separately from the development frame member 30, or may be integrally formed with the development frame member 30.

The development frame member 30 has sleeve support portions 42 for rotatably supporting the developing sleeve 70 by supporting the bearings 71 provided at both end portions of the developing sleeve 70. In addition, the development frame member 30 has the blade attachment portion 41 integrally formed with the sleeve support portions 42, for attaching the doctor blade 36. FIG. 6 illustrates an imaginary state that the doctor blade 36 is lifted from the blade attachment portion 41.

When an adhesive A applied to a blade attachment surface 41*s* of the blade attachment portion 41 is hardened in a state that the doctor blade 36 is attached to the blade attachment portion 41, the doctor blade 36 is fixed to the blade attachment portion 41. The method of fixing the doctor blade 36 to the blade attachment portion 41 will be described later in detail with reference to FIG. 11 and other subsequent drawings (particularly, FIGS. 13, 14A, and 14B).

Rigidity of Doctor Blade Made of Resin

The rigidity of the doctor blade 36 (single member) is described with reference to a schematic view in FIG. 7. The rigidity of the doctor blade 36 (single member) is measured in a state that the doctor blade 36 is not fixed to the blade attachment portion 41 of the development frame member 30.

Figure 7:
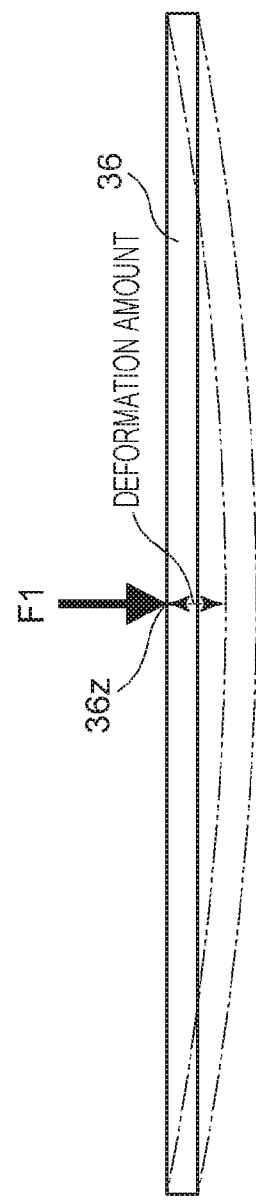
FIG. 7 is a schematic view for explaining rigidity of the doctor blade (single member) made of resin.

As illustrated in FIG. 7, a concentrated load F1 is applied in the widthwise direction of the doctor blade 36 to a center portion 36z of the doctor blade 36 in the lengthwise direction of the doctor blade 36. At this time, the rigidity of the doctor blade 36 (single member) is measured on the basis of the warped amount of the doctor blade 36 in the widthwise direction, at the center portion 36z of the doctor blade 36.

For example, it is assumed that a concentrated load F1 of 300 gf is applied in the widthwise direction of the doctor blade 36 to the center portion 36z of the doctor blade 36 in the lengthwise direction of the doctor blade 36. At this time, the warped amount of the doctor blade 36 in the widthwise direction is 700 μm or larger, at the center portion 36z of the doctor blade 36. In addition, the deformation amount of the center portion 36z of the doctor blade 36 in a section is 5 μm or smaller.

Rigidity of Development Frame Member Made of Resin

The rigidity of the development frame member 30 (single member) is described with reference to a schematic view in FIG. 8. The rigidity of the development frame member 30 (single member) is measured in the state that the doctor blade 36 is not fixed to the blade attachment portion 41 of the development frame member 30.

Figure 8:
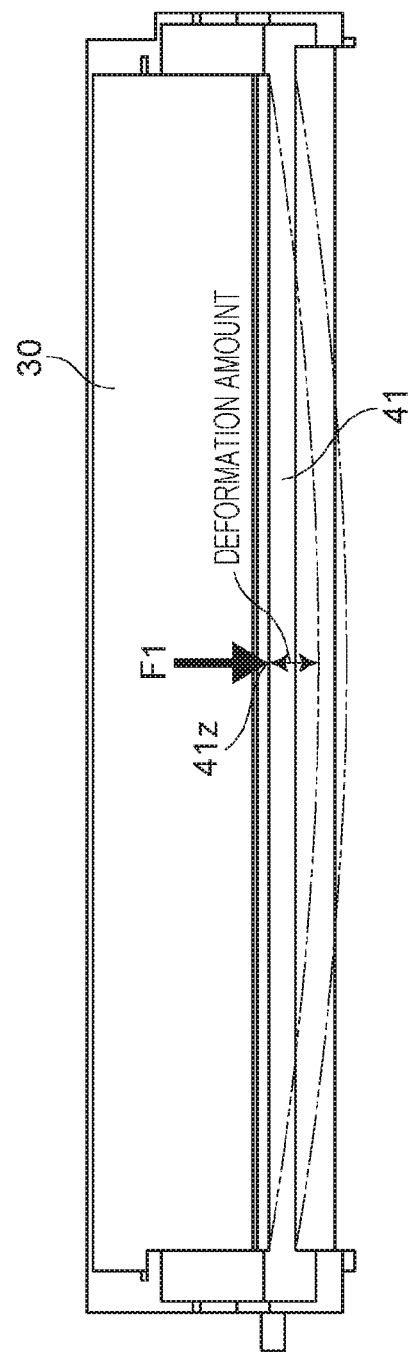
FIG. 8 is a schematic view for explaining rigidity of the development frame member (single member) made of resin.

As illustrated in FIG. 8, a concentrated load F1 is applied in the widthwise direction of the blade attachment portion 41 to a center portion 41z of the blade attachment portion 41 in the lengthwise direction of the blade attachment portion 41. At this time, the rigidity of the development frame member 30 (single member) is measured on the basis of the warped amount of the blade attachment portion 41 in the widthwise direction, at the center portion 41z of the blade attachment portion 41.

For example, it is assumed that a concentrated load F1 of 300 gf is applied in the widthwise direction of the blade attachment portion 41 to the center portion 41z of the blade attachment portion 41 in the lengthwise direction of the blade attachment portion 41. At this time, the warped amount of the blade attachment portion 41 in the widthwise direction is 60 μm or smaller, at the center portion 41z of the blade attachment portion 41.

It is assumed that the same magnitude of the concentrated load F1 is applied to each of the center portion 36z of the doctor blade 36 and the center portion 41z of the blade attachment portion 41 of the development frame member 30. At this time, the warped amount of the center portion 36z of the doctor blade 36 is 10 or more times larger than the warped amount of the center portion 41z of the blade attachment portion 41. The rigidity of the development frame member 30 (single member) is 10 or more times higher than the rigidity of the doctor blade 36 (single member). Thus, in the state that the doctor blade 36 is attached to the blade attachment portion 41 of the development frame member 30 and the doctor blade 36 is fixed to the blade attachment portion 41 of the development frame member 30, the rigidity of the development frame member 30 is dominant over the rigidity of the doctor blade 36. When the doctor blade 36, in the entire range of the maximum image area of the doctor blade 36, is fixed to the development frame member 30, the rigidity of the doctor blade 36 in the fixed state to the development frame member 30 is higher than the rigidity of the doctor blade 36 when only both end portions of the doctor blade 36 in the lengthwise direction are fixed to the development frame member 30.

In addition, the magnitude of the rigidity of the development frame member 30 (single member) is larger than the magnitude of the rigidity of the cover frame member 40 (single member). Thus, in the state that the cover frame member 40 is attached to the development frame member 30 and the cover frame member 40 is fixed to the development frame member 30, the rigidity of the development frame member 30 is dominant over the rigidity of the cover frame member 40.

Adhesive

In the first embodiment, by hardening the adhesive A applied to the blade attachment surface 41s of the blade attachment portion 41 in the state that the doctor blade 36 is attached to the blade attachment portion 41, the doctor blade 36 is fixed to the blade attachment portion 41. When the adhesive A is selected, the adhesive A is required to have a bonding strength at a certain level that the doctor blade 36 is not peeled off from the blade attachment surface 41s of the development frame member 30 during the image forming operation (development operation). The load that is applied to the doctor blade 36 during the image forming operation (development operation) is about 2 kgf during a drop test. The bonding strength has no problem as far as the doctor blade 36 is not peeled off from the blade attachment surface 41s of the development frame member 30 under the load of such a magnitude. It has been figured out that a typical adhesive A ensures a sufficient bonding strength. In the viewpoint of ensuring mass production, the curing time of the adhesive A is desirably as short as possible.

The film thickness of the adhesive A applied to the blade attachment surface 41s of the development frame member 30 is described next. Since the doctor blade 36 is coupled to the blade attachment surface 41s of the development frame member 30 by using the adhesive A, the adhesive A is provided between the doctor blade 36 and the blade attachment surface 41s of the development frame member 30. Thus, the film thickness of the adhesive A that is applied to the blade attachment surface 41s is required to be considered so that the adhesive A provided between the doctor blade 36 and the blade attachment surface 41s of the development frame member 30 does not affect the size of the SB gap G.

Regarding the relationship between the film thickness of the adhesive A and the magnitude of a braking load of a portion bonded by using the adhesive A, there is a relationship that the bonding strength with the adhesive A increases as the amount of the adhesive A increases. As described above, the magnitude of the load applied to the doctor blade 36 during the image forming operation (development operation) is about 2 kgf. In the first embodiment, by taking into account a margin of strength, the strength required for the bonding strength of the adhesive A is set to 10 kgf or larger. To ensure 10 kgf or larger for the bonding strength of the adhesive A, the film thickness of the adhesive A applied to the blade attachment surface 41s of the development frame member 30 may be 20 μm or larger.

The relationship between the thickness of the adhesive A that is applied and the magnitude of variations in the dimension of the adhesive A in the thickness direction is described next. The dimension of the adhesive A in the thickness direction typically varies more due to the contraction of the adhesive A when the adhesive A is hardened as the film thickness of the adhesive A increases. The magnitude of the variations in the dimension of the adhesive A in the thickness direction when the film thickness of the adhesive A is 150 μm is larger, only by about 8 m, than the magnitude of the variations in the dimension of the adhesive A in the thickness direction when the film thickness of the adhesive A is 30 µm. The difference of about 8 µm as the magnitude of the variations in the dimension of the adhesive A in the thickness direction is at a level ignorable as the effect of the variations in the dimension of the adhesive A in a direction orthogonal to the thickness direction (that is, the direction in which the SB gap G is determined). Thus, the upper limit of the film thickness of the adhesive A that is applied to the blade attachment surface 41s of the development frame member 30 may be determined in accordance with individual production requirements such as the curing time and the cost of the adhesive A, instead of determination based on the effect of the contraction of the adhesive A.

Linear Expansion Coefficient

Deformation of the doctor blade 36 and the development frame member 30 due to a temperature change by the heat generated during the image forming operation is described next with reference to a perspective view in FIG. 9. The heat generated during the development operation includes, for example, the heat generated during rotation of the rotary shaft of the developing sleeve 70 and the bearings 71, the heat generated during rotation of the rotary shaft 33a of the first conveying screw 33 and its bearing members, and the heat generated when the developer passes through the SB gap G. With such heat generated during the image forming operation, the temperature around the developing device 3 changes, and the temperatures of the doctor blade 36, the development frame member 30, and the cover frame member 40 also change.

Figure 9:
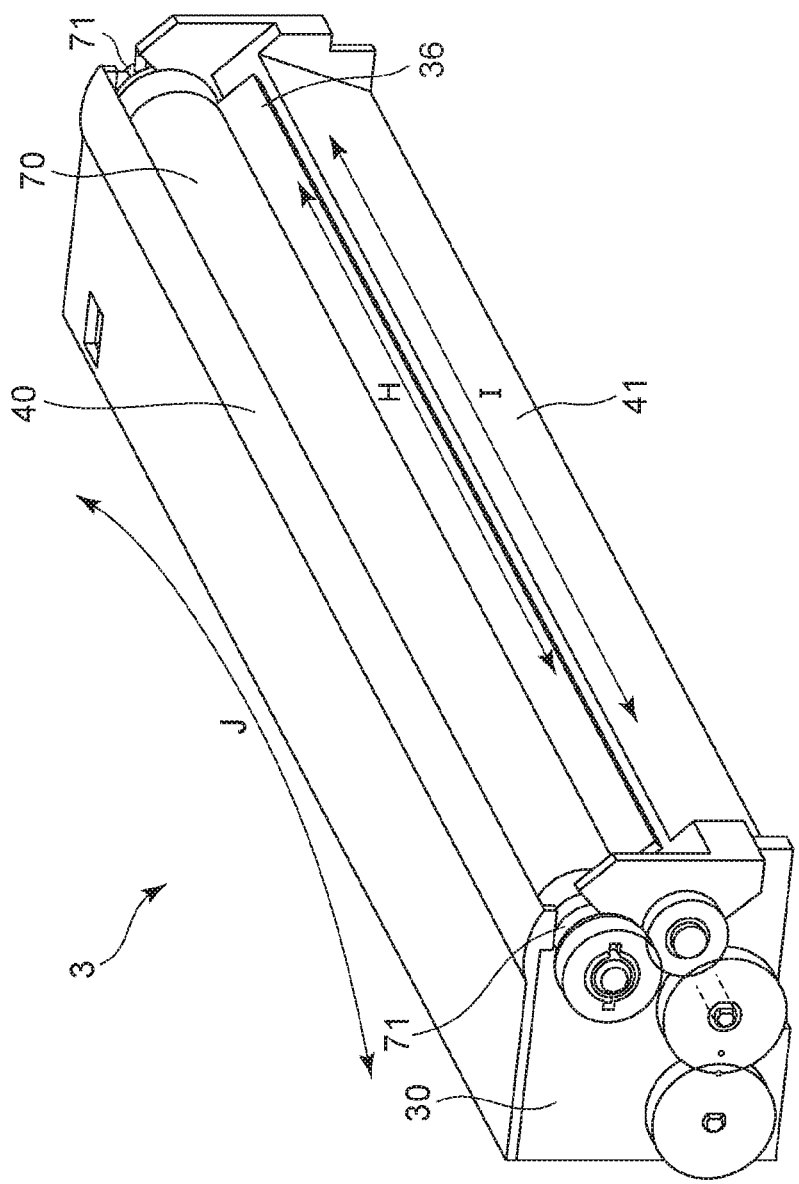
FIG. 9 is a perspective view for explaining deformation of the doctor blade made of resin caused by a temperature change.

As illustrated in FIG. 9, it is assumed that H [µm] is an extension amount of the doctor blade 36 due to a temperature change, and I [µm] is an extension amount of the blade attachment surface 41s of the blade attachment portion 41 of the development frame member 30 due to a temperature change. In addition, it is assumed that a linear expansion coefficient α1 of resin constituting the doctor blade 36 differs from a linear expansion coefficient α2 of resin constituting the development frame member 30. In this case, the deformation amount of the development frame member 30 due to a temperature change differs from the deformation amount of the doctor blade 36 due to a temperature change because of the difference between their linear expansion coefficients. To remove the difference between H [µm] and I [µm], the doctor blade 36 is deformed in an arrow J direction in FIG. 9. The deformation of the doctor blade 36 in the arrow J direction in FIG. 9 is hereinafter referred to as deformation of the doctor blade 36 in a warp direction. The deformation of the doctor blade 36 in the warp direction leads to the variations in the size of the SB gap G. Suppression of the variations in the size of the SB gap G due to heat relates to each of the linear expansion coefficient α2 of the resin constituting the sleeve support portions 42 and the blade attachment portion 41 of the development frame member 30 (single member) and the linear expansion coefficient α1 of the resin constituting the doctor blade 36 (single body). That is, when the linear expansion coefficient α1 of the resin constituting the doctor blade 36 differs from the linear expansion coefficient α2 of the resin constituting the development frame member 30, the deformation amount due to a temperature change may vary because of the difference between the linear expansion coefficients.

A resin material typically has a larger linear expansion coefficient than that of a metal material. When the doctor blade 36 is made of resin, warp deformation occurs at the doctor blade 36 due to a temperature change because of the heat generated during the image forming operation, and a center portion of the doctor blade 36 in the lengthwise direction is likely warped. Consequently, in the developing device in which the doctor blade 36 made of resin is fixed to the development frame member made of resin, the size of the SB gap G likely varies due to a temperature change during the image forming operation.

To correct the straightness of the coating-amount regulating surface 36r to be 50 µm or smaller, at least a portion of the maximum image area of the doctor blade 36 is warped. Then, a method of fixing the doctor blade 36 whose at least the portion in the maximum image area of the doctor blade 36 is warped, to the blade attachment portion 41 of the development frame member 30 by using the adhesive A in the entire range of the maximum image area of the doctor blade 36 is employed.

In this case, if the difference between the linear expansion coefficient α2 of the resin constituting the development frame member 30 and the linear expansion coefficient α1 of the resin constituting the doctor blade 36 is large, the following problem arises when the temperature changes. That is, when the temperature changes, the deformation amount (expansion and contraction amount) of the doctor blade 36 due to the temperature change differs from the deformation amount (expansion and contraction amount) of the development frame member 30 due to the temperature change. Consequently, even if the SB gap G is precisely adjusted when the position at which the doctor blade 36 is attached to the blade attachment surface 41s of the development frame member 30 is determined, the size of the SB gap G may vary due to the temperature change during the image forming operation.

Since the doctor blade 36 in the entire range of the maximum image area of the doctor blade 36 is fixed to the blade attachment surface 41s, the variations in the size of the SB gap G due to the temperature change during the image forming operation is required to be suppressed. The variation amount of the SB gap G due to heat is required to be suppressed typically to ±20 µm or smaller to suppress unevenness of the amount of the developer carried on the surface of the developing sleeve 70 in the lengthwise direction B of the developing sleeve 70.

The difference between the linear expansion coefficient α1 of the resin constituting the doctor blade 36 and the linear expansion coefficient α2 of the resin constituting the development frame member 30 having the sleeve support portions 42 and the blade attachment portion 41 is referred to as a linear expansion coefficient difference α2−α1. A change in the maximum warped amount of the doctor blade 36 due to the linear expansion coefficient difference α2−α1 is described with reference to Table 1. In the state that the doctor blade 36 in the entire range of the maximum image area of the doctor blade 36 is fixed to the blade attachment portion 41 of the development frame member 30, the maximum warped amount of the doctor blade 36 when the temperature changes from a normal temperature (23° C.) to a high temperature (40° C.) is measured.

It is assumed that α2 [m/° C.] is the linear expansion coefficient of the resin constituting the development frame member 30 having the sleeve support portions 42 and the blade attachment portion 41 and α1 [m/° C.] is the linear expansion coefficient of the resin constituting the doctor blade 36. Then the parameter of the linear expansion coefficient difference α2−α1 is changed and the maximum warped amount of the doctor blade 36 is measured with each parameter. Table 1 provides the results of the measurement. Table 1 indicates "○" for the maximum warped amount when the absolute value of the maximum warped amount of the doctor blade 36 is 20 μm or smaller, and indicates "x" for the maximum warped amount when the absolute value of the maximum warped amount of the doctor blade 36 is larger than 20 μm.

TABLE 1

| Linear expansion coefficient difference α2 − α1 [×10⁻⁵ m/° C.] | | | | | | | | |
|---|---|---|---|---|---|---|---|---|
| 0 | +0.20 | +0.40 | +0.50 | +0.54 | +0.55 | +0.56 | +0.57 | +0.60 |
| Maximum warped amount of doctor blade | | | | | | | | |
| O | O | O | O | O | O | X | X | X |

| Linear expansion coefficient difference α2 − α1 [×10⁻⁵ m/° C.] | | | | | | | |
|---|---|---|---|---|---|---|---|
| 0 | −0.20 | −0.40 | −0.44 | −0.45 | −0.46 | −0.47 | −0.50 |
| Maximum warped amount of doctor blade | | | | | | | |
| O | O | O | O | O | X | X | X |

As understood from the Table 1, the linear expansion coefficient difference α2-α1 is required to satisfy the following relational expression (1) to hold the variation amount of the SB gap G due to heat to be ±20 μm or smaller.

$$-0.45\times10^{-5}\ [m/°\ C.] \le \alpha2-\alpha1 \le 0.55\times10^{-5}\ [m/°\ C.] \quad (1)$$

Owing to this, the resin constituting the development frame member 30 and the resin constituting the doctor blade 36 may be selected so that the linear expansion coefficient difference α2-α1 is in a range from −0.45×10⁻⁵ [m/° C.] (inclusive) to 0.55×10⁻⁵ [m/° C.] (inclusive). When the same resin is selected for the resin constituting the development frame member 30 and the resin constituting the doctor blade 36, the linear expansion coefficient difference α2-α1 is zero.

When the adhesive A is applied to the doctor blade 36 and the development frame member 30, the linear expansion coefficients of the doctor blade 36 and the development frame member 30 to which the adhesive A has been applied vary. However, the volume of the adhesive A applied to the doctor blade 36 and the development frame member 30 is very small, and hence is ignorable in terms of the effect on the variations in the dimension of the adhesive A in the thickness direction due to a temperature change. Thus, the deformation of the doctor blade 36 in the warp direction due to the variations in the linear expansion coefficient difference α2-α1 when the adhesive A is applied to the doctor blade 36 and the development frame member 30 is ignorable.

Since the cover frame member 40 is fixed to the development frame member 30, if the deformation amount of the development frame member 30 due to a temperature change differs from that of the cover frame member 40 due to a temperature change, the deformation of the cover frame member 40 in the warp direction may lead to the variations in the size of the SB gap G. It is assumed that α2 [m/° C.] is the linear expansion coefficient of the resin constituting the development frame member 30 having the sleeve support portions 42 and the blade attachment portion 41 and α3 [m/° C.] is a linear expansion coefficient of resin constituting the cover frame member 40. Then, the difference of the linear expansion coefficient α3 of the resin constituting the cover frame member 40 with respect to the linear expansion coefficient α2 of the resin constituting the development frame member 30 having the sleeve support portions 42 and the blade attachment portion 41 is hereinafter referred to as a linear expansion coefficient difference α3-α2. In this case, the linear expansion coefficient difference α3-α2 is required to satisfy the following relational expression (2) in a manner similar to Table 1.

$$-0.45\times10^{-5}\ [m/°\ C.] \le \alpha3-\alpha2 \le 0.55\times10^{-5}\ [m/°\ C.] \quad (2)$$

Owing to this, the resin constituting the development frame member 30 and the resin constituting the cover frame member 40 may be selected so that the linear expansion coefficient difference α3-α2 is in a range from −0.45×10⁻⁵ [m/° C.] (inclusive) to 0.55×10⁻⁵ [m/° C.] (inclusive). When the same resin is selected for the resin constituting the development frame member 30 and the resin constituting the cover frame member 40, the linear expansion coefficient difference α3-α2 is zero.

Developer Pressure

Figure 10:
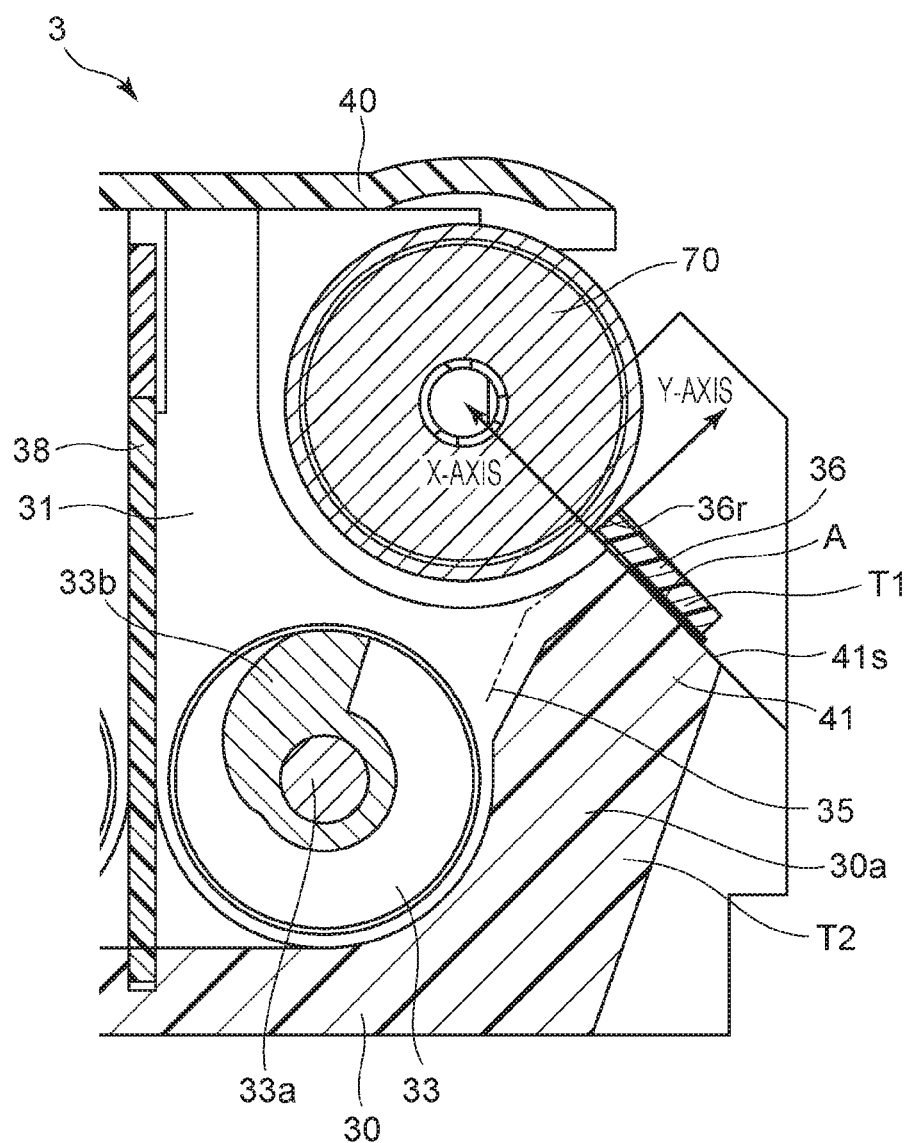
FIG. 10 is a cross-sectional view for explaining deformation of the doctor blade made of resin caused by a developer pressure.

Deformation of the doctor blade 36 due to the developer pressure, which is generated through the flow of the developer during the image forming operation and applied to the doctor blade 36, is described next with reference to a cross-sectional view in FIG. 10. FIG. 10 is a cross-sectional view of the developing device 3 along a section (section H in FIG. 2) orthogonal to the rotational axis of the developing sleeve 70. FIG. 10 also illustrates a configuration in the vicinity of the doctor blade 36 fixed to the blade attachment portion 41 of the development frame member 30 using the adhesive A.

As illustrated in FIG. 10, it is assumed that the X-axis is a line connecting the rotation center of the developing sleeve 70 and the closest position of the coating-amount regulating surface 36r of the doctor blade 36 to the developing sleeve 70. In this case, the doctor blade 36 has a large length in the X-axis direction and has a high rigidity in a section in the X-axis direction. In addition, as illustrated in FIG. 10, the ratio of a sectional area T1 of the doctor blade 36 to a sectional area T2 of a wall portion 30a of the development frame member 30 located near the developer guide portion 35 is small.

As described above, the rigidity of the development frame member 30 (single member) is 10 or more times higher than the rigidity of the doctor blade 36 (single member). Thus, in the state that the doctor blade 36 is fixed to the blade attachment portion 41 of the development frame member 30, the rigidity of the development frame member 30 is dominant over the rigidity of the doctor blade 36. Consequently, the displacement amount (the maximum warped amount) of the coating-amount regulating surface 36r of the doctor blade 36 when the doctor blade 36 receives the developer pressure during the image forming operation is substantially equivalent to the displacement amount (the maximum warped amount) of the development frame member 30.

The developer brought up from the first conveying screw 33 during the image forming operation passes through the developer guide portion 35 and is conveyed to the surface of the developing sleeve 70. The doctor blade 36 receives the developer pressure in various directions thereafter even when the doctor blade 36 determines the layer thickness of the developer to the size of the SB gap G. As illustrated in FIG. 10, when it is assumed that the Y-axis is the direction orthogonal to the X-axis direction (the direction in which the SB gap G is determined), the developer pressure in the Y-axis direction is perpendicular to the blade attachment surface 41s of the development frame member 30. That is, the developer pressure in the Y-axis direction acts as a force in a direction in which the doctor blade 36 is peeled off from the blade attachment surface 41s. Thus, the coupling force of the adhesive A is required to be large enough against the developer pressure in the Y-axis direction. By taking into account the force to peel off the doctor blade 36 from the blade attachment surface 41s by the developer pressure and the bonding force of the adhesive A, the bonding area and the application thickness of the adhesive A to the blade attachment surface 41s are optimized.

Correction on Straightness of Doctor Blade Made of Resin

As the width of a sheet S on which an image is formed increases such as when the width of the sheet S corresponds to A3 size, the length of the maximum image area among the image areas in which images each can be formed on the surface of the photoreceptor drum 1 in a direction parallel to the rotational axis of the developing sleeve 70 increases. As the width of the sheet S in which an image is formed increases, the length of the maximum image area of the doctor blade 36 increases. When the doctor blade having the increased length in the lengthwise direction is molded using resin, it is difficult to ensure the straightness of the coating-amount regulating surface of the doctor blade made of resin and molded using resin. In the case where the doctor blade having the increased length in the lengthwise direction is to be molded using resin, when the thermally expanded resin thermally contracts, there may be likely a portion where the thermal contraction progresses and a portion where the thermal contraction delays depending on the position of the doctor blade in the lengthwise direction.

Thus, with the doctor blade made of resin, the SB gap more likely varies in the lengthwise direction of the developer bearing member due to the straightness of the coating-amount regulating surface of the doctor blade as the length of the doctor blade in the lengthwise direction increases. If the SB gap varies in the lengthwise direction of the developer bearing member, the amount of the developer carried on the surface of the developer bearing member may be uneven in the lengthwise direction of the developer bearing member.

For example, when a doctor blade made of resin and having a length in the lengthwise direction corresponding to A3 size (hereinafter, referred to as doctor blade made of resin and corresponding to A3 size) is manufactured with typical resin-molded-part precision, the straightness of the coating-amount regulating surface is in a range of from about 300 μm to about 500 μm. Even if the doctor blade made of resin and corresponding to A3 size is manufactured with high precision by using a precise resin material, the straightness of the coating-amount regulating surface is in a range of from about 100 μm to about 200 μm.

According to the first embodiment, the size of the SB gap G is set to about 300 μm, and the tolerance of the SB gap G (that is, the tolerance of the SB gap G with respect to the target value) is set to ±10% or less. This represents that, according to the first embodiment, the adjustment range of the SB gap G is 300±30 μm and the allowable tolerance of the SB gap G is 60 μm at the maximum. In either of the case where the doctor blade made of resin and corresponding to A3 size is manufactured with typical resin-molded-part precision and the case where it is manufactured using a precise resin material, the precision of the straightness of the coating-amount regulating surface exceeds the range allowable for the tolerance of the SB gap G.

In the developing device including the doctor blade made of resin, it is desirable that the SB gap G falls within a predetermined range in the lengthwise direction of the developing sleeve in a state that the doctor blade is fixed to the blade attachment portion irrespective of the straightness of the coating amount regulating surface. To meet this, according to the first embodiment, "a force for warping a doctor blade" is applied to the doctor blade even when a doctor blade made of resin and having a low straightness of the coated-amount regulating surface is used. Thus, in the state that the doctor blade made of resin is fixed to the blade attachment portion of the development frame member made of resin, the SB gap G is held within a predetermined range in the lengthwise direction of the developing sleeve (the direction parallel to the rotational axis of the developing sleeve).

The developing sleeve has a component tolerance of the developing sleeve and an assembly tolerance of the developing sleeve when the developing sleeve is assembled with the development frame member. Thus, by taking into account the component tolerance of the developing sleeve and the assembly tolerance of the developing sleeve, when the doctor blade is fixed to the blade attachment portion of the development frame member, it is required to adjust the relative position of the doctor blade relative to the developing sleeve assembled with the development frame member.

In addition, in the developing device including the doctor blade made of resin and the development frame member made of resin, the doctor blade may be attached to the blade attachment portion of the development frame member and is fixed using the adhesive. With this configuration, the adhesive is applied by a predetermined film thickness to, for example, a surface (blade attachment surface) of the blade attachment portion to which the doctor blade is attached.

The following configuration may be conceived as a configuration that fixes the doctor blade made of resin to the blade attachment portion using the adhesive. The configuration applies "the force for warping the doctor blade" to the doctor blade while the relative position of the doctor blade relative to the developing sleeve assembled with the development frame member is adjusted in a state that the doctor blade is attached to the blade attachment portion on which the adhesive has been applied. With this configuration, along with the application of "the force for warping the doctor blade" to the doctor blade, a force of action and reaction is applied to the surface (blade attachment surface) of the blade attachment portion that contacts the doctor blade.

More specifically, the configuration applies "the force for warping the doctor blade" to the doctor blade in a direction in which the relative position of the doctor blade relative to the developing sleeve supported by the development frame member is adjusted in a state that the doctor blade made of resin is attached to the blade attachment portion. In this case, along with the application of "the force for warping the doctor blade" to the doctor blade, a frictional force is generated at "the surface of the doctor blade that contacts the blade attachment portion". Then, a force (force of action and reaction) having a magnitude equivalent to the magnitude of the frictional force generated at the surface of the doctor blade that contacts the blade attachment portion is exerted on the surface (the blade attachment surface) of the blade attachment portion that contacts the doctor blade. The force of action and reaction may elastically deform the surface (the blade attachment surface) of the blade attachment portion that contacts the doctor blade.

In this way, it is assumed that the doctor blade is fixed to the blade attachment portion using the adhesive in the state that the surface (the blade attachment surface) of the blade attachment portion that contacts the doctor blade is elastically deformed because "the force for warping the doctor blade" is applied to the doctor blade. In such a case, if the application of "the force for warping the doctor blade" to the doctor blade is stopped, the elastically deformed blade attachment surface is deformed to be restored to the original state before the elastic deformation accordingly. At this time, as the degree by which the surface (the blade attachment surface) of the blade attachment portion that contacts the doctor blade is elastically deformed increases, the degree by which the elastically deformed blade attachment surface is deformed to be restored to the original state before the elastic deformation increases. Consequently, the position of a distal end portion of the doctor blade bonded to the blade attachment portion varies, and the relative position of the doctor blade relative to the developing sleeve supported by the development frame member varies.

Although the doctor blade has been fixed to the blade attachment portion using the adhesive so that the size of the SB gap G falls within the predetermined range, due to the variations, the size of the SB gap G may vary after the doctor blade is bonded to the blade attachment portion. However, since the doctor blade has been already bonded to the blade attachment portion, it is difficult to adjust again the relative position of the doctor blade relative to the developing sleeve supported by the development frame member so that the size of the SB gap G falls within the predetermined range.

The following configuration may be requested for the configuration that fixes the doctor blade made of resin to the blade attachment portion of the development frame member made of resin using the adhesive. The configuration applies "the force for warping the doctor blade" to the doctor blade while the relative position of the doctor blade relative to the developing sleeve assembled with the development frame member is adjusted so that the blade attachment surface is not elastically deformed.

According to the first embodiment, the relative position of the doctor blade relative to the developing sleeve supported by the development frame member is adjusted so that a predetermined force is not exerted on the blade attachment surface because "the force for warping the doctor blade" is applied to the doctor blade. The predetermined force is a force having a force component in a direction in which the relative position of the doctor blade relative to the developing sleeve supported by the development frame member is adjusted. As far as the predetermined force is not exerted on the blade attachment surface when "the force for warping the doctor blade" is applied to the doctor blade, the elastic deformation of the blade attachment surface because "the force for warping the doctor blade" is applied to the doctor blade does not occur.

More specifically, "the force for warping the doctor blade" is applied to the doctor blade in a state that the doctor blade is separated from the blade attachment portion on which the adhesive has been applied, to adjust the relative position of the doctor blade relative to the developing sleeve supported by the development frame member. Hence, when "the force for warping the doctor blade" is applied to the doctor blade, "the force having the force component in the direction in which the relative position of the doctor blade relative to the developing sleeve supported by the development frame member" is not exerted on the blade attachment surface. Thus, the elastic deformation of "the surface (blade attachment surface) of the blade attachment portion on which the doctor blade is attached" because "the force for warping the doctor blade" is applied to the doctor blade does not occur.

According the first embodiment described above, in the configuration in which the doctor blade made of resin and having the regulating portion with low precision of straightness is bonded to the blade attachment portion of the development frame member made of resin, the SB gap G falls within a predetermined range in the lengthwise direction of the developing sleeve. The details are described below.

Method of Fixing Doctor Blade Made of Resin

In the first embodiment, it is determined whether or not the SB gap G falls within a predetermined range in the direction parallel to the rotational axis of the developing sleeve 70 by the method described below. First, the maximum image area of the doctor blade 36 is divided at four or more equidistant positions, and the SB gap G is measured at five or more positions of the divided portions of the doctor blade 36 (including both end portions and a center portion of the maximum image area of the doctor blade 36). Then, the maximum of the SB gap G, the minimum of the SB gap G, and the median of the SB gap G are extracted from the samples of the measurement values of the SB gap G measured at the five or more positions as described above. In this case, the absolute value of the difference between the maximum of the SB gap G and the median of the SB gap G may be 10% or less of the median of the SB gap G, and the absolute value of the difference between the minimum of the SB gap G and the median of the SB gap G may be 10% or less of the median of the SB gap G. In this case, the SB gap G falls within a predetermined range in the direction parallel to the rotational axis of the developing sleeve 70 while the tolerance of the SB gap G is ±10% or less. For example, when the median of the SB gap G is 300 μm obtained from the samples of the measurement values of the SB gap G measured at the five or more positions, the maximum of the SB gap G may be 330 μm or smaller, and the minimum of the SB gap G may be 270 μm or larger. In this case, the adjustment range of the SB gap G is 300±30 μm and the allowable tolerance of the SB gap G is 60 μm at the maximum.

Steps of the method of fixing the doctor blade 36 are described now with reference to schematic views in FIGS. 11 to 14B. An external device (hereinafter, merely referred to as device 100) performs steps of a method of fixing the doctor blade 36 which is described below.

The device 100 detects the external shape of the coating-amount regulating surface 36r of the doctor blade 36. Then, for the external shape of the coating-amount regulating surface 36r in the lengthwise direction of the coating-amount regulating surface 36r, the device 100 recognizes the straightness of the coating-amount regulating surface 36r with reference to a center portion of the coating-amount regulating surface 36r (a distal end portion 36e3 of the doctor blade 36). The steps of the method of fixing the doctor blade 36 use a doctor blade made of resin, corresponding to A3 size, and manufactured with typical resin-molded-part precision. The device 100 recognizes that the straightness of the coating-amount regulating surface 36r is in a range from about 300 μm to about 500 μm. The device 100 warps at least a portion of an area corresponding to the maximum image area of the doctor blade 36 by the force applied to the doctor blade 36. The device 100 corrects the straightness of the coating-amount regulating surface 36r to 50 μm or smaller (hereinafter, referred to as warping step).

Then, the device 100 determines a position of the blade attachment portion 41 at which the doctor blade 36, whose at least the portion of the area corresponding to the maximum image area has been warped in the warping step, is fixed to the blade attachment portion 41 of the development frame member 30 to cause the SB gap G to fall within the predetermined range (hereinafter, referred to as positioning step). Then, the device 100 fixes the portion of the area corresponding to the maximum image area of the doctor blade 36, at the predetermined position of the blade attachment portion 41 determined in the positioning step, in a state that the portion of the area corresponding to the maximum image area of the doctor blade 36 is warped (hereinafter, referred to as fixing step).

The device 100 includes a mount table 103 on which the doctor blade 36 (single member) is mounted. The device 100 also includes fingers 101 (101*p*1 to 101*p*5) at five positions for respectively grabbing grips 37 (37*p*1 to 37*p*5) provided at five positions within the area corresponding to the maximum image area of the doctor blade 36. The fingers 101 (101*p*1 to 101*p*5) can move in an arrow J direction in FIG. 11 and individually independently advance or retract in the arrow J direction in FIG. 11.

The device 100 further includes cameras 102 (102*p*1 to 102*p*5) at five positions for respectively measuring five positions of distal end portions 36*e* (36*e*1 to 36*e*5) included in the coating-amount regulating surface 36*r* of the doctor blade 36. The cameras 102 (102*p*1 to 102*p*5) are disposed along a direction (arrow F direction in FIG. 11) toward the distal end portions 36*e* (36*e*1 to 36*e*5) of the doctor blade 36. The cameras 102 (102*p*1 to 102*p*5) detect the external shape of the coating-amount regulating surface 36*r* of the doctor blade 36 by measuring the positions of the distal end portions 36*e* (36*e*1 to 36*e*5) of the doctor blade 36. Then, for the external shape of the coating-amount regulating surface 36*r* in the lengthwise direction of the coating-amount regulating surface 36*r*, the device 100 recognizes the straightness of the coating-amount regulating surface 36*r* with reference to the center portion of the coating-amount regulating surface 36*r* (the distal end portion 36*e*3 of the doctor blade 36). While an example will be described below in which the positions of the distal end portions 36*e* (36*e*1 to 36*e*5) of the doctor blade 36 are measured using the cameras 102 (102*p*1 to 102*p*5), a modification that performs the measurement using a non-contact sensor may be employed.

The doctor blade 36 is manufactured with typical resin-molded-part precision. When the doctor blade made of resin and corresponding to A3 size is manufactured with typical resin-molded-part precision as described above, the straightness of the coating-amount regulating surface is in a range of from about 300 μm to about 500 μm. It is assumed that the doctor blade 36 is the doctor blade made of resin and corresponding to A3 size, which is manufactured with typical resin-molded-part precision. In this case, in the state that the doctor blade 36 is mounted on the mount table 103, the five positions of the distal end portions 36*e* (36*e*1 to 36*e*5) of the doctor blade 36 may have a difference in a range of from about 300 μm to about 500 μm when measured using the cameras 102 (102*p*1 to 102*p*5). As described above, to suppress unevenness of the amount of the developer carried on the surface of the developing sleeve 70 in the lengthwise direction of the developing sleeve 70, the tolerance of the SB gap G is set to ±10% or less.

Hence, it is required to correct the straightness of each of the distal end portions 36*e*1 to 36*e*5 of the doctor blade 36 (that is, the straightness of the coating-amount regulating surface 36*r*) to 50 μm or smaller with regard to the allowable value of the tolerance of the SB gap G and the attachment precision of the doctor blade 36 with respect to the development frame member 30. It is more desirable to correct the straightness of the coating-amount regulating surface 36*r* of the doctor blade 36 made of resin to 20 μm or smaller with regard to that the precision of the straightness of a doctor blade made of metal by secondary cutting is 20 μm or smaller.

A series of steps (warping step, positioning step, and fixing step) of the method of fixing the doctor blade 36 is described below in detail.

(1) Warping Step

Figure 11:
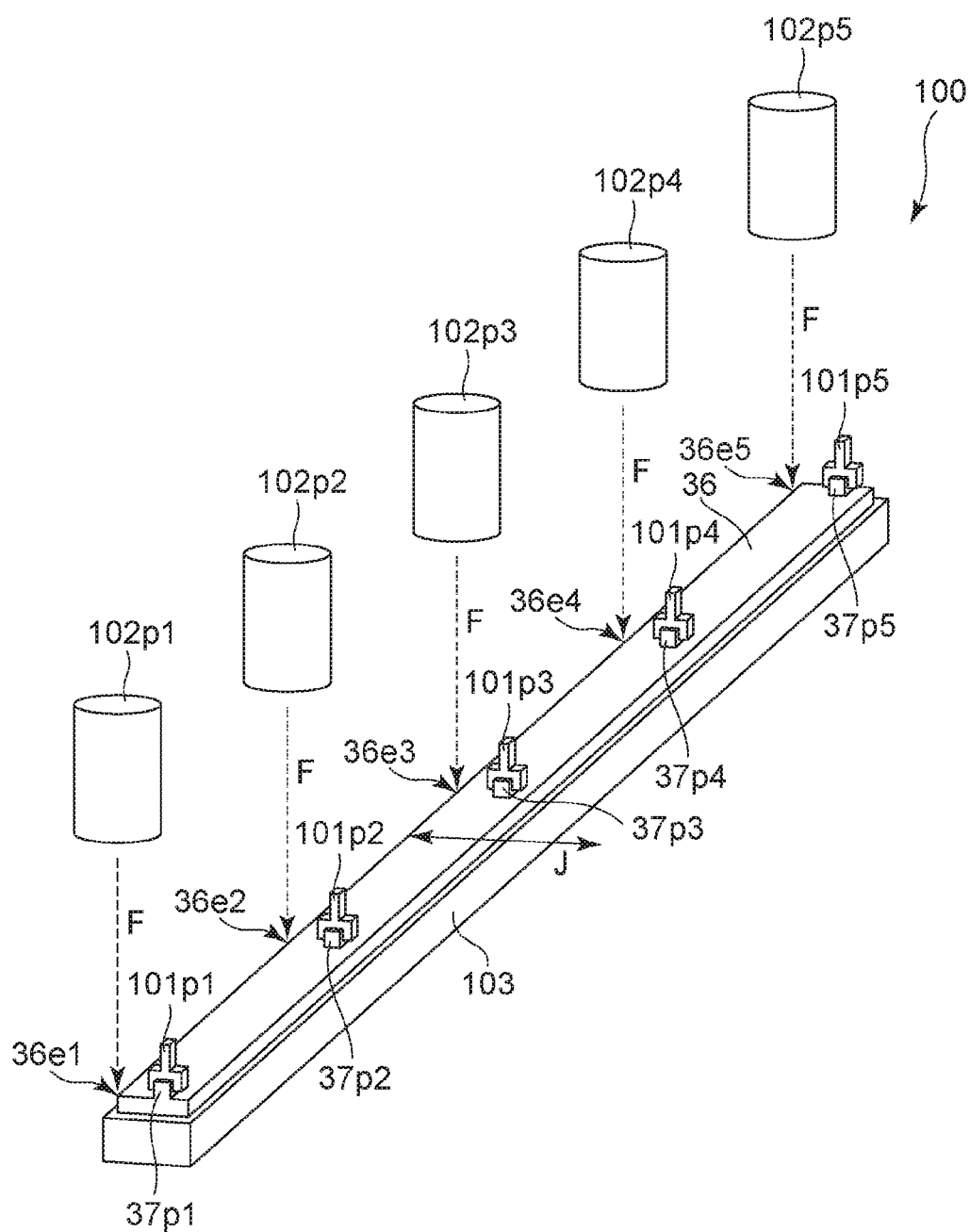
FIG. 11 is a schematic view for explaining a step of a method of fixing the doctor blade made of resin.

The warping step is described in detail first with reference to a schematic view in FIG. 11. The device 100 holds the doctor blade 36 by the fingers 101 (101*p*1 to 101*p*5) grabbing the grips 37 (37*p*1 to 37*p*5) of the doctor blade 36. Then, the cameras 102 (102*p*1 to 102*p*5) measure the positions of the distal end portions 36*e* (36*e*1 to 36*e*5) of the doctor blade 36 in the state that the fingers 101 (101*p*1 to 101*p*5) grab the grips 37 (37*p*1 to 37*p*5) of the doctor blade 36. Accordingly, the device 100 detects the external shape of the coating-amount regulating surface 36*r* of the doctor blade 36. Then, for the external shape of the coating-amount regulating surface 36*r* in the lengthwise direction of the coating-amount regulating surface 36*r*, the device 100 recognizes the straightness of the coating-amount regulating surface 36*r* with reference to the center portion of the coating-amount regulating surface 36*r* (the distal end portion 36*e*3 of the doctor blade 36).

The device 100 moves the fingers 101 (101*p*1 to 101*p*5) in the arrow J direction in FIG. 11 in the state that the fingers 101 grab the grips 37 (37*p*1 to 37*p*5) of the doctor blade 36. Thus, the device 100 applies to the doctor blade 36 a force for warping at least a portion of an area corresponding to the maximum image area of the doctor blade 36 via the grips 37 of the doctor blade 36 gripped by the fingers 101. Thus, the grips 37 of the doctor blade 36 serve as force receiving portions for receiving the force applied to the doctor blade 36 from the device 100 for warping at least the portion of the area corresponding to the maximum image area of the doctor blade 36.

Figure 12:
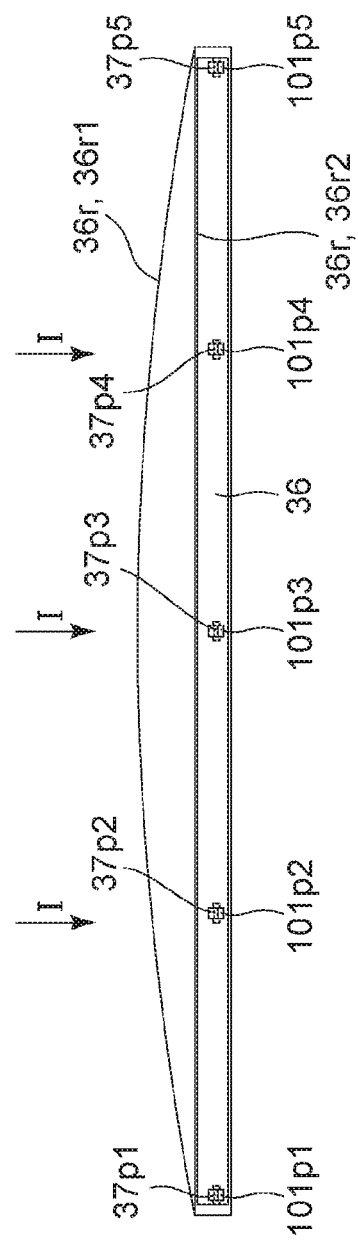
FIG. 12 is a schematic view for explaining a step of the method of fixing the doctor blade made of resin.

As illustrated in FIG. 12, the doctor blade 36 (single member) has a shape in which the center portion of the coating-amount regulating surface 36*r* of the doctor blade 36 in the lengthwise direction of the doctor blade 36 is largely warped. Thus, it is required to correct the straightness of the coating-amount regulating surface 36*r* of the doctor blade 36 by decreasing the differences among the positions of the distal end portions 36*e* (36*e*1 to 36*e*5) of the doctor blade 36. To correct the straightness, the differences among the positions of the distal end portions 36*e* (36*e*1 to 36*e*5) of the doctor blade 36 are decreased on the basis of the results obtained by measuring the positions of the distal end portions 36*e* (36*e*1 to 36*e*5) of the doctor blade 36 (the detected external shape of the coating-amount regulating surface 36*r*). Thus, the device 100 applies to the doctor blade 36 the force (also referred to as straightness correction force) for warping at least the portion of the area corresponding to the maximum image area of the doctor blade 36, to correct the straightness of the coating-amount regulating surface 36*r* to 50 μm or smaller.

Then, the device 100 holds the doctor blade 36 by the fingers 101 (101*p*1 to 101*p*5) grabbing the grips 37 (37*p*1 to 37*p*5) of the doctor blade 36 mounted on the mount table 103. The device 100 moves the fingers 101 (101*p*1 to 101*p*5) to individually independently advance or retract in the arrow J direction in FIG. 11 in the state that the fingers 101 grab the grips 37 (37*p*1 to 37*p*5) of the doctor blade 36. At this time, the device 100 applies to the doctor blade 36 the force for warping at least the portion of the area corresponding to the maximum image area of the doctor blade 36 via the grips 37 of the doctor blade 36.

In the example in FIG. 12, the device 100 applies the straightness correction force to the doctor blade 36 to align the external shapes of the distal end portions 36e2, 36e3, and 36e4 with the external shapes of the distal end portions 36e1 and 36e5 of the doctor blade 36 while the external shapes of the distal end portions 36e1 and 36e5 serve as the references. In the example in FIG. 12, the doctor blade 36 receives the force for warping at least the portion of the area corresponding to the maximum image area of the doctor blade 36 via the grips 37 (37p2 to 37p4) at the three positions among the five positions. With the force received by the doctor blade 36 via the grips 37 (37p2 to 37p4) at the three positions, the straightness correction force for correcting the straightness of the coating-amount regulating surface 36r is exerted on the distal end portions 36e2 to 36e4 of the doctor blade 36 as in an arrow I direction in FIG. 12. At this time, the straightness correction force is exerted on the coating-amount regulating surface 36r, at least the portion of the area corresponding to the maximum image area of the doctor blade 36 is warped, and hence the straightness of the coating-amount regulating surface 36r of the doctor blade 36 is corrected. In the example in FIG. 12, the shape of the coating-amount regulating surface 36r of the doctor blade 36 is corrected from a coating-amount regulating surface 36r1 to a coating-amount regulating surface 36r2.

Consequently, the straightness of the coating-amount regulating surface 36r of the doctor blade 36 can be corrected to 50 μm or smaller. In the example in FIG. 12, the reference with which the device 100 aligns the external shape of the distal end portions 36e of the doctor blade 36 is the external shapes of the distal end portions 36e1 and 36e5 of the doctor blade 36; however, the reference may be the distal end portion 36e3 (that is, the center portion of the coating-amount regulating surface 36r) according to a modification. In the modification, the device 100 applies the straightness correction force to the doctor blade 36 to align the external shapes of the distal end portions 36e1, 36e2, 36e4, and 36e5 with the external shape of the distal end portion 36e3 of the doctor blade 36 while the external shape of the distal end portion 36e3 serves as the reference.

In the first embodiment, the setting value of the straightness correction of the coating-amount regulating surface 36r of the doctor blade 36 is set within a range from about 20 μm to about 50 μm, and the magnitude of the straightness correction force to be exerted on the distal end portion 36e of the doctor blade 36 is set to about 500 g in view of the actual mass production process. A smaller magnitude of the straightness correction force to be exerted on the distal end portion 36e of the doctor blade 36 can decrease the cost and size of the device 100. However, an excessively small magnitude of the straightness correction force to be exerted on the distal end portions 36e of the doctor blade 36 in comparison with the magnitude of the rigidity of the doctor blade 36 no longer corrects the straightness of the coating-amount regulating surface 36r of the doctor blade 36. Thus, the magnitude of the straightness correction force to be exerted on the distal end portion 36e of the doctor blade 36 is set on the basis of the magnitude of the rigidity of the doctor blade 36.

In the example in FIG. 11, the grips 37 are provided at the five positions of the doctor blade 36; however, the positions of the grips 37 provided at the doctor blade 36 and the number of the grips 37 are not limited thereto as far as the straightness correction force can be exerted on the coating-amount regulating surface 36r. In addition, in the example in FIG. 11, the grips 37 of the doctor blade 36 each have a protruding shape; however, the shape of the grip 37 is not limited thereto. As described above, the fingers 101 grab the grips 37 of the doctor blade 36 so that the device 100 applies to the doctor blade 36 the force (straightness correction force) for warping at least the portion of the area corresponding to the maximum image area of the doctor blade 36. As far as the fingers 101 can grab the grips 37, the shape of each grip 37 may be, instead of the protruding shape, for example, a recessed shape, a groove shape, a notch shape, or a flat shape; or a combination of at least two of these shapes. In the drawings illustrating the doctor blade 36 among the drawings of the specification, the grips 37 of the doctor blade 36 are omitted except FIGS. 11 to 14B.

(2) Positioning Step

Figure 13:
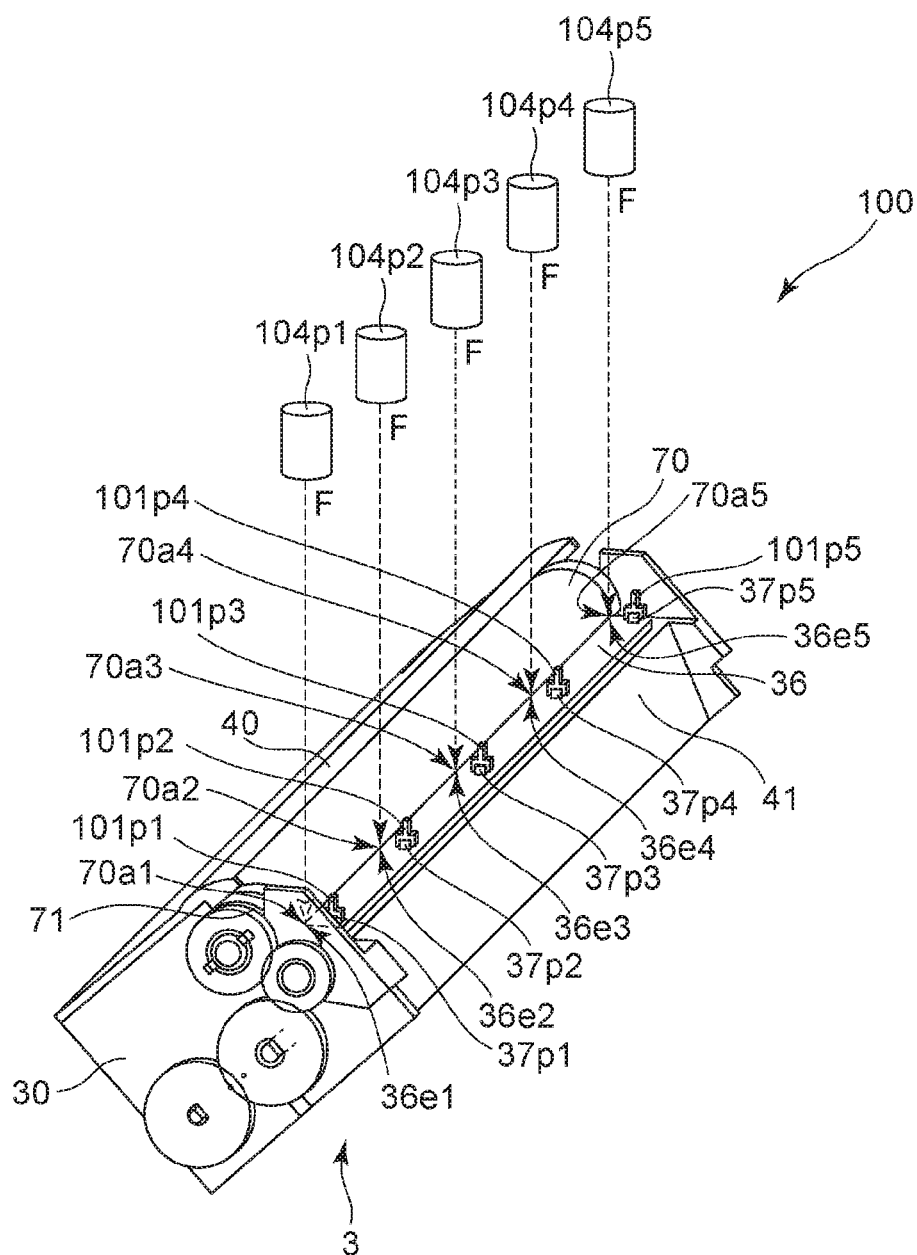
FIG. 13 is a schematic view for explaining a step of the method of fixing the doctor blade made of resin.
Figure 14A:
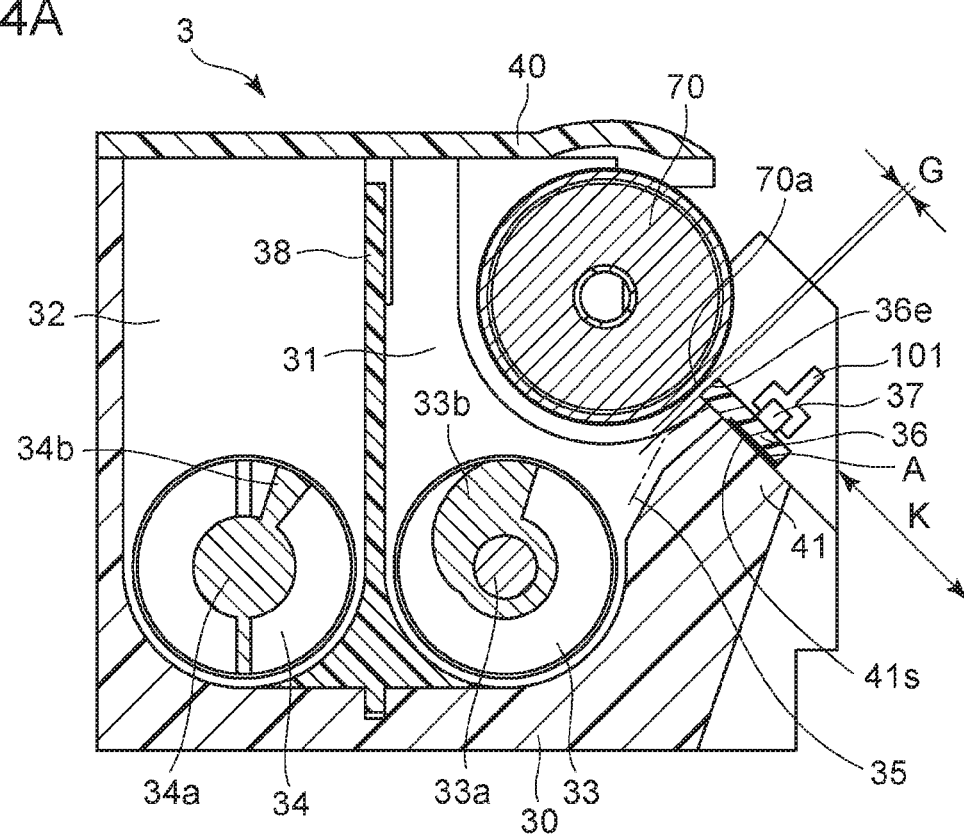
FIGS. 14A and 14B are schematic views for explaining a step of the method of fixing the doctor blade made of resin.
Figure 14B:
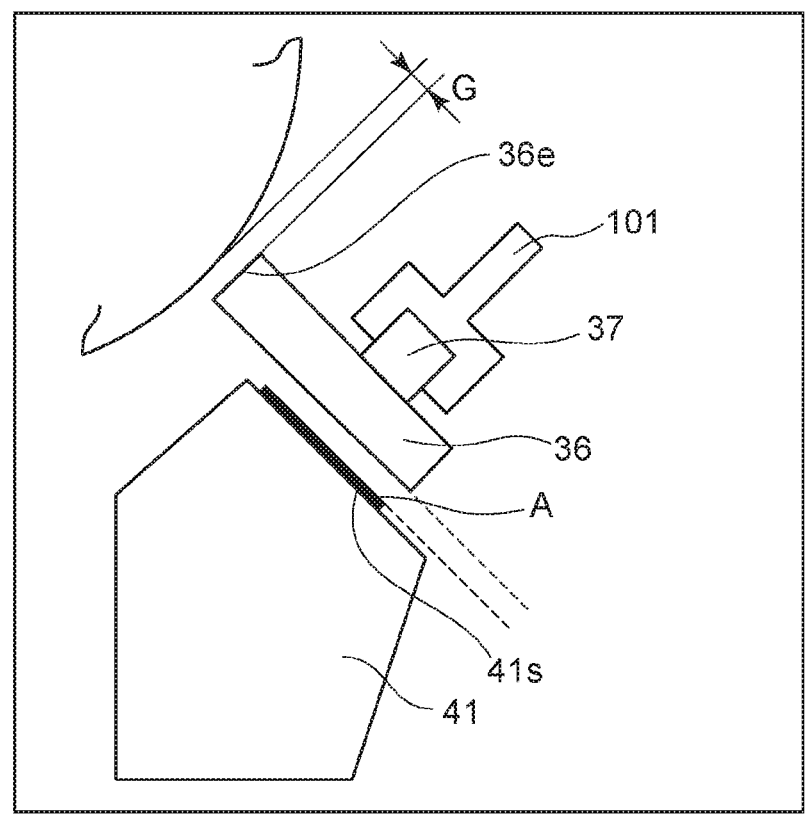

The positioning step is described in detail next with reference to schematic views in FIGS. 13, 14A, and 14B. As illustrated in FIGS. 13, 14A, and 14B, the positioning step is performed in a state that the developing sleeve 70 is supported by the sleeve support portions 42 of the development frame member 30 (that is, in a state that the developing sleeve 70 is assembled with the development frame member 30). The positioning step is performed in a state that the adhesive A is applied to the blade attachment surface 41s. That is, in the first embodiment, an adhesive application step of applying the adhesive A to the blade attachment surface 41s is performed before the positioning step.

FIG. 14A is a schematic view in a state that the fingers 101 (101p1 to 101p5) hold the grips 37 (37p1 to 37p5) of the doctor blade 36 warped in the warping step. FIG. 14B is an enlarged view in the vicinity of the blade attachment surface 41s when the doctor blade 36 is held by the fingers 101 in a state that the doctor blade 36 is separated from the adhesive A and the blade attachment surface 41s on which the adhesive A has been applied.

The fingers 101 (101p1 to 101p5) move the doctor blade 36 from the mount table 103 to the blade attachment portion 41 while holding the doctor blade 36 warped in the warping step (that is, in the state that the straightness of the coating-amount regulating surface 36r has been corrected). Note that the moving amount and the moving direction of the fingers 101 (101p1 to 101p5) are previously set by a program. The fingers 101 (101p1 to 101p5) are driven by an actuator and operate in accordance with a previously set program.

The device 100 moves the warped doctor blade 36 to the blade attachment portion 41 while being held in the state that the fingers 101 (101p1 to 101p5) grab the grips 37 (37p1 to 37p5) of the doctor blade 36 warped in the warping step. At this time, the device 100 holds the doctor blade 36 while the fingers 101 grab the grips 37 of the warped doctor blade 36 in the state that the doctor blade 36 is separated from the adhesive A and the blade attachment surface 41s on which the adhesive A has been applied.

For example, it is assumed that the film thickness of the adhesive A applied to the blade attachment surface 41s of the development frame member 30 is 100 μm. In this case, the doctor blade 36 is held at a position several millimeters separated from the blade attachment surface 41s upward in the vertical direction, with a margin from the blade attachment surface 41s of the development frame member 30.

It is assumed that the force for warping the doctor blade is applied to the doctor blade 36 to adjust the relative position of the doctor blade 36 relative to the developing sleeve 70 in a state that the doctor blade 36 is landed on the blade attachment surface 41s on which the adhesive A has been applied. In this case, as the result that the force for warping the doctor blade 36 is exerted on the doctor blade 36 to adjust the relative position of the doctor blade 36 relative to the developing sleeve 70 supported by the development frame member 30, the adhesive A starts being locally solidified. Then, the adjusting operation of the relative position of the doctor blade 36 relative to the developing sleeve 70 supported by the development frame member 30 in an arrow K direction illustrated in FIG. 14A is performed, following which the blade attachment portion 41 of the development frame member 30 may be deformed (elastically deformed).

As described above, it is assumed that "the force for warping the doctor blade 36" is applied to the doctor blade 36 in the direction in which the relative position of the doctor blade 36 relative to the developing sleeve 70 is adjusted in the state that the doctor blade 36 is attached to the blade attachment portion 41. In this case, when the force is exerted on the doctor blade 36, a frictional force is generated at "the surface of the doctor blade 36 that contacts the blade attachment portion 41". Then, a force (force of action and reaction) having a magnitude equivalent to the magnitude of the frictional force generated on "the surface of the doctor blade 36 that contacts the blade attachment portion 41" is exerted on the blade attachment surface 41s. The force of action and reaction may elastically deform the blade attachment surface 41s.

In this way, it is assumed that the doctor blade 36 is fixed to the blade attachment portion 41 using the adhesive A in the state that the blade attachment surface 41s is elastically deformed as the result that "the force for warping the doctor blade 36" is applied to the doctor blade 36. After the doctor blade 36 is fixed to the blade attachment portion 41 using the adhesive A, the fingers 101 are released from the doctor blade 36. With the release, the elastically deformed blade attachment surface 41s is deformed to be restored to the original state before the elastic deformation. At this time, a variation occurs in the degree of the elastic deformation of the blade attachment surface 41s and the deformation amount of the blade attachment portion 41 in the lengthwise direction, due to a variation in the solidification of the adhesive A, and the number of times of adjustment and the adjustment direction of the relative position of the doctor blade 36 relative to the developing sleeve 70. As the degree by which the blade attachment surface 41s is elastically deformed increases, the degree by which the elastically deformed blade attachment surface 41s is deformed so as to be restored to the original state before the elastic deformation increases. Consequently, the positions of distal end portions 36e (36e1 to 36e5) of the doctor blade 36 bonded to the blade attachment portion 41 vary, and the relative position of the doctor blade 36 relative to the developing sleeve 70 supported by the development frame member 30 varies. For example, it is assumed that the adjustment value of the SB gap G is 300±30 μm and the allowable tolerance of the SB gap G is 60 μm at the maximum. In this case, a variation in the SB gap G due to the adhesive A occupies 40% of the maximum tolerance.

Although the doctor blade 36 is fixed to the blade attachment portion 41 using the adhesive A so that the size of the SB gap G falls within the predetermined range, due to the variations, the size of the SB gap G may vary after the doctor blade 36 is bonded to the blade attachment portion 41. However, since the doctor blade 36 has been already bonded to the blade attachment portion 41, it is difficult to adjust again the relative position of the doctor blade 36 relative to the developing sleeve 70 supported by the development frame member 30 so that the size of the SB gap G falls within the predetermined range. Thus, in the first embodiment, the force for warping the doctor blade 36 is applied to the doctor blade 36 to adjust the relative position of the doctor blade 36 relative to the developing sleeve 70 in the state that the doctor blade 36 is separated from the adhesive A and the blade attachment surface 41s on which the adhesive A has been applied. Accordingly, the relative position of the doctor blade 36 relative to the developing sleeve 70 supported by the development frame member 30 can be precisely adjusted without deformation of the blade attachment portion 41.

As described above, to suppress unevenness of the amount of the developer carried on the surface of the developing sleeve 70 in the lengthwise direction of the developing sleeve 70, the range of the tolerance of the SB gap G (an allowable range for the tolerance with respect to the target value of the SB gap G) is set to around 60 μm. The range of the tolerance of the SB gap G is severe as described above. By merely landing the doctor blade 36 on the blade attachment surface 41s, the size of the SB gap G less likely falls within the adjustment range of the SB gap G (including the target value of the SB gap G) taking into account the range of the tolerance of the SB gap G. Thus, adjustment is required to bring the size of the SB gap G within the adjustment range of the SB gap G by determining the position of the blade attachment surface 41s of the development frame member 30 at which the doctor blade 36 is fixed so that the size of the SB gap G falls within the range of the tolerance.

The device 100 further includes cameras 104 (104p1 to 104p5) at five positions for respectively measuring the five positions of the distal end portions 36e (36e1 to 36e5) of the doctor blade 36 in the state separated from the adhesive A and the blade attachment surface 41s on which the adhesive A has been applied. The cameras 104 (104p1 to 104p5) are disposed along a direction (arrow F direction in FIG. 13) toward the distal end portions 36e (36e1 to 36e5) of the doctor blade 36. The cameras 104 can measure the positions of the distal end portions 36e (36e1 to 36e5) of the doctor blade 36. While an example will be described below in which the positions of the distal end portions 36e (36e1 to 36e5) of the doctor blade 36 are measured using the cameras 104 (104p1 to 104p5) according to the first embodiment, the measurement may be performed using a non-contact sensor according to a modification.

A method of measuring (method of calculating) the size of the SB gap G is described now. The SB gap G is measured in a state that the developing sleeve 70 is supported by the development frame member 30 and the doctor blade 36 is not attached to the blade attachment portion 41 (in the state that the doctor blade 36 is separated from the adhesive A and the blade attachment surface 41s on which the adhesive A has been applied). In addition, to measure the size of the SB gap G, a light source (for example, a light-emitting diode (LED) array or a light guide) is inserted into the developing chamber 31 in the lengthwise direction of the developing chamber 31. The light source inserted into the developing chamber 31 irradiates the SB gap G with light from the inside of the developing chamber 31. The cameras 104 (104p1 to 104p5) capture light beams emitted outside the development frame member 30 from the SB gap G.

The cameras 104 are attached movably to positions of at least two levels of a lower position and an upper position. In this case, the lower position is a position at which the focal length is adjusted when the doctor blade 36 is attached to the blade attachment surface 41s. The upper position is a position for reading the positions of the distal end portions 36e of the doctor blade 36 when the doctor blade 36 is held by the fingers 101 in the state that the doctor blade 36 is separated from the adhesive A and the blade attachment surface 41s on which the adhesive A has been applied.

First, the cameras 104 (104p1 to 104p5) read, at the lower position, the position of the developing sleeve 70 at the surface of the developing sleeve 70. Then, the cameras 104 (104p1 to 104p5) are moved from the lower position to the upper position. The cameras 104 read the positions of the distal end portions 36e (36e1 to 36e5) of the doctor blade 36 when the doctor blade 36 is held by the fingers 101 in the state that the doctor blade 36 is separated from the adhesive A and the blade attachment surface 41s on which the adhesive A has been applied.

Then, the device 100 converts pixel values from image data read and generated with the cameras 104 (104p1 to 104p5) into distances. The device 100 calculates the size of the SB gap G on the basis of position information of the developing sleeve 70 read when the cameras 104 are located at the lower position and position information of the distal end portions 36e (36e1 to 36e5) of the doctor blade 36 read when the cameras 104 are located at the upper position. When the calculated size of the SB gap G does not fall within the adjustment range of the SB gap G, the device 100 adjusts the relative position of the doctor blade 36 relative to the developing sleeve 70 supported by the development frame member 30. After the relative position of the doctor blade 36 relative to the developing sleeve 70 supported by the development frame member 30 is adjusted, the cameras 104 (104p1 to 104p5) read again, at the lower position, the position of the developing sleeve 70 at the surface of the developing sleeve 70. The device 100 calculates again the size of the SB gap G on the basis of the position information of the developing sleeve 70 read when the cameras 104 are located at the lower position and the position information of the distal end portions 36e (36e1 to 36e5) of the doctor blade 36 read again at the upper position. If the size of the SB gap G which has been calculated again falls within the adjustment range of the SB gap G, the doctor blade 36 is attached to the blade attachment surface 41s on which the adhesive A has been applied and the process goes to the fixing step (described later).

The method of adjusting the relative position of the doctor blade 36 relative to the developing sleeve 70 supported by the development frame member 30 is described now in detail with reference to the schematic view in FIG. 14A. The device 100 moves the fingers 101 in the arrow K direction in FIG. 14A in the state that the fingers 101 (101p1 to 101p5) grab the grips 37 (37p1 to 37p5) of the doctor blade 36. The arrow K direction in FIG. 14A is the direction in which the relative position of the doctor blade 36 relative to the developing sleeve 70 supported by the sleeve support portions 42 of the development frame member 30 is adjusted (that is, the direction in which the SB gap G is determined). The arrow K direction in FIG. 14A also indicates a direction in which the doctor blade 36 moves toward or away from the developing sleeve 70 supported by the sleeve support portions 42 of the development frame member 30. The relative positions of the distal end portions 36e (36e1 to 36e5) of the doctor blade 36 relative to positions 70a (70a1 to 70a5) at which the developing sleeve 70 is the closest to the doctor blade 36 at the surface of the developing sleeve 70 are adjusted.

For example, it is assumed that the doctor blade 36 is held by the fingers 101 in the state that the doctor blade 36 is separated from the adhesive A and the blade attachment surface 41s on which the adhesive A has been applied. Then, it is assumed that the SB gap G calculated at an initial position at which one camera 104p1 among the cameras 104 (104p1 to 104p5) at the five positions has measured the SB gap G is 350 μm. In contrast, it is assumed that the adjustment range of the SB gap G is 300±30 μm and the allowable tolerance of the SB gap G is 60 μm at the maximum. In this case, at the initial position when the doctor blade 36 is held by the fingers 101 in the state that the doctor blade 36 is separated from the adhesive A and the blade attachment surface 41s on which the adhesive A has been applied, the SB gap G is larger than the nominal value 300 μm by 50 μm. Hence, the fingers 101 translate the doctor blade 36 in the arrow K direction indicated in FIG. 14A, and in other words, in a direction in which the doctor blade 36 is moved toward the surface of the developing sleeve 70 by 50 μm, in the state that the fingers 101 grab the grips 37 of the doctor blade 36.

Then, the camera 104p1 reads the distal end portion 36e1 of the doctor blade 36 translated by the finger 101p1. Then, the device 100 calculates again the SB gap G for the doctor blade 36 translated by the finger 101p1.

If the device 100 determines that the calculated size of the SB gap G falls within the range of the adjustment value (300±30 μm) of the SB gap G at the position of the finger 101p1, the device 100 ends the adjustment of the SB gap G at the position of the finger 101p1. If the device 100 determines that the calculated size of the SB gap G does not fall within the range of the adjustment value (300±30 μm) of the SB gap G, the device 100 repeats the adjustment of the SB gap G until the calculated size of the SB gap G falls within the range of the adjustment value (300±30 μm). The above-described adjusting operation is performed independently in parallel at the five positions of the fingers 101 (101p1 to 101p5). Assuming that the device 100 determines that all the sizes of the SB gap G respectively calculated at the five positions of the fingers 101 (101p1 to 101p5) fall within the range of the adjustment value (300±30 μm) of the SB gap G. In this case, the fingers 101 (101p1 to 101p5) move the doctor blade 36 in a direction perpendicular to the adjustment direction to land the doctor blade 36 onto the blade attachment surface 41s. Then, the process goes to the fixing step (described later).

To adjust the SB gap with further high precision, it is required to consider the straightness of the surface of the developing sleeve 70 in addition to the straightness of the coating-amount regulating surface 36r of the doctor blade 36. Since the sleeve tube constituting the outer shell of the developing sleeve 70 is made of metal, the straightness of the surface of the developing sleeve 70 can be made with as precise as ±15 μm or smaller by secondary cutting. However, the straightness of ±15 μm of the developing sleeve 70 is interpreted such that the outside diameter of the developing sleeve 70 apparently varies by ±15 μm when the developing sleeve 70 is in the rotating state in actual use. Hence, the fingers 101 perform the following operation while translating the doctor blade 36 in the direction in which the doctor blade 36 is moved toward the surface of the developing sleeve 70. That is, the SB gap G is measured while the developing sleeve 70 is rotated to minimize the effect on the SB gap G due to the precision of the straightness of the coating-amount regulating surface 36r of the doctor blade 36 when the developing sleeve 70 is in the rotating state. At this time, the doctor blade 36 is separated from the adhesive A and the blade attachment surface 41s on which the adhesive A has been applied. Thus, the SB gap G can be adjusted with further high precision with regard to the straightness of the surface of the developing sleeve 70.

(3) Fixing Step

The fixing step is described in detail next with reference to the schematic view in FIG. 14A. In the first embodiment, as illustrated in FIG. 14A, the fixing step is performed in a state that the doctor blade 36 warped in the warping step is landing at the predetermined position of the blade attachment portion 41 of the development frame member 30 determined in the positioning step.

When the doctor blade 36 is fixed to the blade attachment portion 41 using the adhesive A, to bond the doctor blade 36 to the blade attachment portion 41 with sufficient bonding strength, the degree of close contact between the doctor blade 36 and the blade attachment portion 41 is important. This is because, when the doctor blade 36 is fixed to the blade attachment portion 41 using the adhesive A, if the gap between the doctor blade 36 and the blade attachment portion 41 is large, the bonding strength is weakened even though the adhesive A is provided at the gap.

To provide a desirable bonding strength between the blade attachment portion 41 and the doctor blade 36 landing at the predetermined position of the blade attachment portion 41, the doctor blade 36 is required to be in close contact with the blade attachment portion 41 in a period until the adhesive A is hardened. Thus, the device 100 applies a load to bring the doctor blade 36 into close contact with the blade attachment portion 41 by dropping a weight having a predetermined weight on the doctor blade 36 in the state that the doctor blade 36 lands on the blade attachment surface 41s of the development frame member 30. To obtain a sufficient bonding strength, such a load is continuously applied for a period until the adhesive A is sufficiently hardened, and the fingers 101 have to continuously hold the doctor blade 36 in the state that the doctor blade 36 is in close contact with the blade attachment portion 41. For example, when the hardening period of the adhesive A is 15 seconds, the load for bringing the doctor blade 36 into close contact with the blade attachment portion 41 may be set for 20 seconds by taking into account a margin.

After the bonding of the doctor blade 36 to the blade attachment portion 41 is completed, the device 100 lifts the weight and removes the load from the doctor blade 36. Then, the device 100 operates the fingers 101 (101p1 to 101p5) to separate the fingers 101 (101p1 to 101p5) from the doctor blade 36. Then, the device 100 moves the fingers 101 (101p1 to 101p5) to preparation positions for the next operation.

In the first embodiment, the device 100 applies the adhesive A in the substantially entire range of the area corresponding to the maximum image area of the blade attachment surface 41s before the doctor blade 36 lands on the blade attachment surface 41s of the development frame member 30. Then, the doctor blade 36 warped in the warping step is bonded (fixed) to the blade attachment portion 41 in the substantially entire range of the area corresponding to the maximum image area. At this time, the doctor blade 36 is bonded (fixed) to the blade attachment portion 41 in the state that the straightness of the coating-amount regulating surface 36r is corrected to 50 μm or smaller. In the first embodiment, as described above, the area warped for correcting the straightness of the coating-amount regulating surface 36r, in the area corresponding to the maximum image area of the doctor blade 36, is fixed to the blade attachment portion 41. This can suppress occurrence of a phenomenon in which the area warped for correcting the straightness of the coating-amount regulating surface 36r, in the area corresponding to the maximum image area of the doctor blade 36, is restored to the original state before being warped.

In the above-described example in FIG. 11 to 14B, the device 100 applies the adhesive A in the substantially entire range of the area corresponding to the maximum image area of the blade attachment surface 41s before the doctor blade 36 lands on the blade attachment surface 41s of the development frame member 30. In contrast, there may be an area where the device 100 has difficulty in applying the adhesive A to the blade attachment surface 41s depending on the shape of the blade attachment portion 41. In such a case, the adhesive A does not have to be applied to a portion of the blade attachment surface 41s as far as the area that receives the force for warping at least the portion of the area corresponding to the maximum image area of the doctor blade 36 is fixed to the blade attachment portion 41 using the adhesive A.

Shortly, the situation in which the adhesive A is applied in the substantially entire range of the area corresponding to the maximum image area of the blade attachment surface 41s satisfies the following conditions. The adhesive A is applied to an area that includes the area warped for correcting the straightness of the coating-amount regulating surface 36r, in the area corresponding to the maximum image area of the doctor blade 36, and that is 95% or more of the area corresponding to the maximum image area in the lengthwise direction of the blade attachment surface 41s.

In the example in FIGS. 11 to 14B, the adhesive A is applied to the blade attachment portion 41. However, the adhesive A may be applied to both the blade attachment portion 41 and the doctor blade 36 according to a modification. In addition, if the adhesive A is applied to the blade attachment portion 41 at a timing in parallel to the warping step, the total time required for the series of steps of the method of fixing the doctor blade 36 can be decreased. That is, this example represents a series of steps of applying the adhesive A to the blade attachment portion 41 of the development frame member 30 while the straightness of the coating-amount regulating surface 36r is corrected. In the above-described example in FIG. 11 to 14B, the step of applying the adhesive A to the blade attachment portion 41 of the development frame member 30 (adhesive application step) is performed before the positioning step.

In the case where the adhesive application step is performed before the positioning step, if the hardening of the adhesive A excessively progresses in the middle of the positioning step, the doctor blade 36 is no longer bonded to the blade attachment portion 41 when the doctor blade 36 is landed on the blade attachment portion 41. Thus, the positioning step is required to be completed in a period before the hardening of the adhesive A progresses. The period in which the adhesive A is hardened is determined in accordance with the material of the adhesive A and the application amount of the adhesive A. Thus, the period in which the adhesive A is hardened can be predicted by a certain degree. The number of times the SB gap G can be repeatedly adjusted until the hardening of the adhesive A progresses is previously determined on the basis of the time required for every adjustment of the SB gap G. Thus, since the adhesive A is not sufficiently hardened within the range of the number of times, the SB gap G can be repeatedly adjusted.

According to the above-described first embodiment, the relative position of the doctor blade relative to the developing sleeve supported by the development frame member is adjusted so that a predetermined force is not exerted on the blade attachment surface as the result that "the force for warping the doctor blade" is applied to the doctor blade. The predetermined force is a force having a force component in a direction in which the relative position of the doctor blade relative to the developing sleeve supported by the development frame member is adjusted. If the predetermined force is not exerted on the blade attachment surface when "the force for warping the doctor blade" is applied to the doctor blade, the elastic deformation of the blade attachment surface as the result that "the force for warping the doctor blade" is applied to the doctor blade does not occur.

According the first embodiment described above, in the configuration in which the doctor blade made of resin having the regulating portion with low precision of straightness is bonded to the blade attachment portion of the development frame member made of resin, the SB gap G can fall within the predetermined range in the lengthwise direction of the developing sleeve.

Other Embodiments

The present invention is not limited to the above-described embodiment, and can be modified (including an organic combination of embodiments) in various ways based on the gist of the invention, and the modifications are included in the scope of the invention.

In the above-described embodiment, as illustrated in FIG. 1, the image forming apparatus 60 having the configuration in which the intermediate transfer belt 61 is used as the intermediate transfer member. However, it is not limited thereto. The present invention can be applied to an image forming apparatus having a configuration in which a recording medium is sequentially brought into direct contact with the photoreceptor drums 1 for transfer.

Moreover, in the above-described embodiment, the developing device 3 is described as a single unit; however, the image forming unit 600 (see FIG. 1) including the developing device 3 may be unitized in the form of a process cartridge that is removably attachable to the image forming apparatus 60. In this case, advantageous effects similar to those described above can be obtained. Furthermore, the present invention can be applied to either of a monochrome machine or a color machine as far as the machine is the image forming apparatus 60 including the developing device 3 or such a process cartridge.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-116527 filed Jun. 19, 2018, which is hereby incorporated by reference herein in its entirety.

What is claimed is:

1. A method of manufacturing a developing device including a development rotary member configured to carry and convey a developer to a development position, a regulating blade made of resin, disposed to face the development rotary member in a non-contact manner, and configured to regulate an amount of a developer carried by the development rotary member, and a development frame member made of resin, including an attachment portion to which the regulating blade is to be attached, and configured to support the development rotary member, the method comprising:

measuring a size of a first gap between the development rotary member supported by the development frame member and the regulating blade in a state that the regulating blade is not attached to the attachment portion but separated from the attachment portion;

applying a force for adjusting a relative position of the regulating blade relative to the development rotary member supported by the development frame member to the regulating blade based on the size of the first gap measured in the measuring in a state that the regulating blade is not attached to the attachment portion but separated from the attachment portion so that a second gap between the development rotary member supported by the development frame member and the regulating blade in a state that the regulating blade is attached to the attachment portion is adjusted to fall within a predetermined range along a rotational axis direction of the development rotary member; and attaching the regulating blade to the attachment portion using an adhesive in a state that the relative position of the regulating blade relative to the development rotary member supported by the development frame member is adjusted by the force applied to the regulating blade in the applying.

2. The method of manufacturing the developing device according to claim 1, wherein in the applying the force, the force for warping the regulating blade is applied to the regulating blade based on the size of the first gap measured in the measuring, and in the attaching, the regulating blade is attached to the attachment portion in a state that the regulating blade is kept warped by the force applied to the regulating blade in the applying.

3. The method of manufacturing the developing device according to claim 1, further comprising applying the adhesive to the attachment portion, wherein in the attaching, the regulating blade is attached to the attachment portion using the adhesive applied to the attachment portion in the applying.

4. The method of manufacturing the developing device according to claim 1, further comprising fixing the regulating blade attached to the attachment portion in the attaching to the attachment portion in a state that the regulating blade is attached to the attachment portion and in a state that the size of the second gap falls within the predetermined range along the rotational axis direction of the development rotary member.

5. The method of manufacturing the developing device according to claim 1, wherein in the measuring, the first gap is measured by such a way that light is emitted toward the first gap from inside of the development frame member by a light source disposed inside the development frame member and an imaging unit disposed outside the development frame member captures light exiting from the first gap to outside the development frame member.

6. The method of manufacturing the developing device according to claim 1, wherein in a case where the size of the second gap at a first position of an area of the regulating blade corresponding to a maximum image area is denoted by $g_1$, the size of the second gap at a second position of the area of the regulating blade corresponding to the maximum image area is denoted by $g_2$, the size of the second gap at a third position of the area of the regulating blade corresponding to the maximum image area is denoted by $g_3$, and a target value of the second gap is denoted by $g_{target}$, the force is applied to the regulating blade in the applying the force, to satisfy $$0.9 \times g_1 \leq g_{target} \leq 1.1 \times g_1,$$

$$0.9 \times g_2 \leq g_{target} \leq 1.1 \times g_2, \text{ and}$$

$$0.9 \times g_3 \leq g_{target} \leq 1.1 \times g_3.$$

7. The method of manufacturing the developing device according to claim 6, wherein the first position of the area of the regulating blade corresponding to the maximum image area is located at a center of the area of the regulating blade corresponding to the maximum image area, the second position of the area of the regulating blade corresponding to the maximum image area is located at one end of the area of the regulating blade corresponding to the maximum image area, and the third position of the area of the regulating blade corresponding to the maximum image area is located at an other end of the area of the regulating blade corresponding to the maximum image area.

8. The method of manufacturing the developing device according to claim 1, wherein a length of the area of the regulating blade corresponding to the maximum image area is a length of an A3 size.

* * * * *